United States Patent
Mohan et al.

(10) Patent No.: US 8,169,179 B2
(45) Date of Patent: May 1, 2012

(54) OPEN-ENDED CONTROL CIRCUIT FOR ELECTRICAL APPARATUS

(75) Inventors: Ned Mohan, St. Paul, MN (US);
Krushna K. Mohapatra, Minneapolis, MN (US)

(73) Assignee: Regents of The University of Minnesota, Minneapolis, MN (US)

( * ) Notice: Subject to any disclaimer, the term of this patent is extended or adjusted under 35 U.S.C. 154(b) by 761 days.

(21) Appl. No.: 11/843,268

(22) Filed: Aug. 22, 2007

(65) Prior Publication Data
US 2008/0049460 A1 Feb. 28, 2008

Related U.S. Application Data

(60) Provisional application No. 60/891,402, filed on Feb. 23, 2007, provisional application No. 60/869,237, filed on Dec. 8, 2006, provisional application No. 60/839,354, filed on Aug. 22, 2006.

(51) Int. Cl.
*H02P 27/04* (2006.01)
(52) U.S. Cl. ........ 318/800; 318/801; 318/722; 318/727; 363/34; 363/40
(58) Field of Classification Search .......... 318/727, 318/801, 710, 718, 722, 800; 363/34, 37, 363/67, 71, 95, 120, 170, 171, 176, 40, 35, 363/55, 56.06; 702/196
See application file for complete search history.

(56) References Cited

U.S. PATENT DOCUMENTS

| | | | | |
|---|---|---|---|---|
| 3,659,168 A * | 4/1972 | Salihi et al. | ................... | 318/800 |
| 4,648,022 A * | 3/1987 | Schauder | ...................... | 363/159 |
| 4,864,483 A | 9/1989 | Divan | | |
| 4,870,557 A * | 9/1989 | Stacey | ........................... | 363/43 |
| 5,495,161 A * | 2/1996 | Hunter | ......................... | 318/807 |
| 5,751,138 A * | 5/1998 | Venkata et al. | ................ | 323/207 |
| 5,831,842 A * | 11/1998 | Ogasawara et al. | ............ | 363/40 |
| 5,852,558 A | 12/1998 | Julian et al. | | |
| 5,883,796 A * | 3/1999 | Cheng et al. | ..................... | 363/40 |
| 5,905,642 A * | 5/1999 | Hammond | ...................... | 363/37 |
| 5,936,856 A * | 8/1999 | Xiang | ............................. | 363/98 |
| 5,949,221 A * | 9/1999 | Edwards | ....................... | 323/209 |
| 6,064,172 A * | 5/2000 | Kuznetsov | .................... | 318/716 |
| 6,163,472 A * | 12/2000 | Colby | ........................... | 363/127 |

(Continued)

FOREIGN PATENT DOCUMENTS

JP 2006217772 8/2006

OTHER PUBLICATIONS

A Direct Frequency Changer With Control of Input Reactive Power, M. Braun and K. Hasse, Copyright IFAC Control in Power Electronics and Electrical Drives, Lausanne, Switzerland, 1983.

(Continued)

*Primary Examiner* — Walter Benson
*Assistant Examiner* — Antony M Paul
(74) *Attorney, Agent, or Firm* — Steven M. Koehler; Westman, Champlin & Kelly, P.A.

(57) ABSTRACT

An AC machine control system for an AC machine (motor, generator, transformer, etc.) having open-ended windings, the control system comprising a drive circuit configured to transfer AC power between a first set of voltages and each end of the open-ended windings without the use of a substantial energy storage device, while eliminating common mode voltage and/or injecting zero sequence voltages.

23 Claims, 43 Drawing Sheets

U.S. PATENT DOCUMENTS

| | | | |
|---|---|---|---|
| 6,185,115 B1 | 2/2001 | Sul et al. | |
| 6,236,583 B1 * | 5/2001 | Kikuchi et al. | 363/132 |
| 6,330,170 B1 | 12/2001 | Wang et al. | |
| 6,351,106 B1 * | 2/2002 | Kramer et al. | 323/258 |
| 6,762,947 B2 | 7/2004 | Hammond | |
| 6,850,424 B2 | 2/2005 | Baudelot et al. | |
| 6,856,038 B2 | 2/2005 | Rebsdorf et al. | |
| 6,944,592 B1 | 9/2005 | Pickering | |
| 6,995,992 B2 * | 2/2006 | Wei et al. | 363/34 |
| 7,084,524 B2 * | 8/2006 | Lacaze et al. | 307/3 |
| 7,106,025 B1 * | 9/2006 | Yin et al. | 318/811 |
| 7,164,254 B2 * | 1/2007 | Kerkman et al. | 318/812 |
| 7,274,576 B1 * | 9/2007 | Zargari et al. | 363/39 |
| 7,606,052 B2 * | 10/2009 | Akagi | 363/40 |

OTHER PUBLICATIONS

A Speed-Sensorless Direct Torque Control Scheme for Matrix Converter Driven Induction Motor, Mohapatra, K.K. Satish, T. Mohan, Ned, IEEE, Department of Electrical and Computer Engineering, University of Minnesota, Minneapolis, MN-55414, IEEE Industrial Electronics, IECON 2006—32nd Annual Conference on, Publication Date: Nov. 2006, pp. 1435-1440, Paris, France.

Modulation methods based on a novel carrier-based PWM scheme for matrix converter operation under unbalanced input voltages Satish, T. Mohapatra, K.K. Mohan, N. Dept. of Electr. & Comput. Eng., Minnesota Univeristy, Minneapolis, MN, USA; Applied Power Electronics Conference and Exposition, 2006. APEC '06. Twenty-First Annual IEEE, Publication Date: Mar. 19-23, 2006.

Analysis and design of optimum-amplitude nine-switch direct AC-AC converters, Alesina, A. Venturini, M.G.B. Dept. of Math., Milan Univ.; Power Electronics, IEEE Transactions, Publication Date: Jan. 1989, vol. 4, Issue: 1, pp. 101-112.

A Novel Carrier-Based PWM Scheme for Matrix Converters that is Easy to Implement, Mohapatra, K.K. Jose, P. Drolia, A. Aggarwal, G. Mohan, N. Thuta, S. Dept. of Elect. & Comput. Eng., Minneapolis Univ., Minneapolis, MN; Power Electronics Specialists Conference, 2005. PESC '05. IEEE 36th, Publication Date: 2005, pp. 2410-2414.

A dual two-level inverter scheme with common mode voltage elimination for an induction motor drive, Baiju, M.R. Mohapatra, K.K. Kanchan, R.S. Gopakumar, K., Centre for Electron. Design & Technol., Indian Inst. of Sci., Bangalore, India; Power Electronics, IEEE, Publication Date: May 2004, vol. 19, Issue: 3, pp. 794-805.

Control of a matrix converter with reduction of a common mode voltage, Rzasa, J. Compatibility in Power Electronics, 2005. IEEE, Jun. 1, 2005 pp. 213-217, Digital Object Identifier.

Matrix converters: a technology review, Wheeler, P.W. Rodriguez, J. Clare, J.C. Empringham, L. Weinstein, A., School of Electr. & Electron. Eng., Nottingham Univ.; Industrial Electronics, IEEE Transactions, Publication Date: Apr. 2002, vol. 49, Issue: 2, pp. 276-288.

Improved PWM method of forced commutated cycloconvertors, Shin, D.-H. Cho, G.-H. Park, S.-B., Dept. of Electr. Eng., Korea Adv. Inst. of Sci. & Technol., Seoul; Electric Power Applications, Publication Date: May 1989 vol. 136, Issue: 3, On pp. 121-126.

Written Opinion of the European Patent Office in counterpart foreign application No. PCT/US2007/018587 filed Aug. 22, 2007.

Official Search Report of the European Patent Office in counterpart foreign application No. PCT/US2007/018587 filed Aug. 22, 2007.

A study on reduction of common-mode voltage in matrix converter with unity input power factor and sinusoidal input/output waveforms, Hong-Hee Lee; Nguyen, H.M.; Eui-Heon Jung, Industrial Electronics Society, 2005. IECON 2005. 31st Annual Conference of IEEE, Volume, Issue, Nov. 6-10, 2005 pp. 7 pp.

Dual two-level inverter scheme for an open-end winding induction motor drive with a single DC power supply and improved DC bus utilisation, Somasekhar, V.T.; Gopakumar, K.; Baiju, M.R., Electric Power Applications, IEE Proceedings—, vol. 151, Issue 2, Mar. 2004 pp. 230-238.

Krushna Mohapatra, Ned Mohan, Nearly Doubling the Power Throughput of AC Motors and Generators by Interfacing their Open-Ended Stator through Matrix Converters, Department of ECE, U. of M., no date given.

Interactive Search-Open-End/Matrix Converter, U.of Minnesota., Taika Pakalns and Dr. Ned Mohan, Jun. 28, 2007.

Technical Research of Energy-Efficient Technologies in the Field of Compressor Technics on the Basis of the Controlled Asynchronous Electric Drive With the Matrix Converter, Zhuykov, V. Sobolev, O. Spivak, V. Nat. Tech. Univ. of Ukraine, Kiev;, Modern Problems of Radio Engineering, Telecommunications, and Computer Science, 2006. TCSET 2006. International Conference, Publication Date: Feb. 28-Mar. 4, 2006 on pp. 148-151.

Configurations of high-power voltage source inverter drives, Stemmler, H. Guggenbach, P., Swiss Federal Inst. of Technol., Zurich; Power Electronics and Applications, 1993., Fifth European Conference, Publication Date: Sep. 13-16, 1993, pp. 7-14 vol. 5, Meeting Date: Sep. 13-16, 1993, Brighton, UK.

Space vector PWM control of dual inverter fed open-end windinginduction motor drive Shivakumar, E.G. Gopakumar, K. Sinha, S.K. Pittet, A. Ranganathan, V.T. ,CEDT, Indian Inst. of Sci., Bangalore; Applied Power Electronics Conference and Exposition, 2001. APEC 2001. Sixteenth Annual IEEE, Publication Date: 2001, vol. 1, pp. 399-405 vol. 1, Meeting Date: Mar. 4-8, 2001, Anaheim, CA, USA.

Inductive and capacitive VAR compensation with forced commutated high-frequency cycloconvertors, Taoud, M.A.; Spronck, F.; de Buck, F., Electronics Letters, vol. 19, Issue 6, Mar. 17, 1983 pp. 203-205.

\* cited by examiner

TABLE – 1
The switching table and corresponding output line voltage and common mode voltage.

| Group | ABC | $V_{AB}$ | $V_{BC}$ | $V_{CA}$ | $V_{COM}$ |
|---|---|---|---|---|---|
| I | a b c | $v_{ab}$ | $v_{bc}$ | $v_{ca}$ | 0 |
|   | a c b | $-v_{ca}$ | $-v_{bc}$ | $-v_{ab}$ | 0 |
|   | b c a | $v_{bc}$ | $v_{ca}$ | $v_{ab}$ | 0 |
|   | b a c | $-v_{ab}$ | $-v_{ca}$ | $-v_{bc}$ | 0 |
|   | c a b | $v_{ca}$ | $v_{ab}$ | $v_{bc}$ | 0 |
|   | c b a | $-v_{bc}$ | $-v_{ab}$ | $-v_{ca}$ | 0 |
| II-A | a c c | $v_{ca}$ | 0 | $-v_{ca}$ | $(v_c - v_b)/3$ |
|   | b c c | $-v_{bc}$ | 0 | $v_{bc}$ | $(v_c - v_a)/3$ |
|   | b a a | $v_{ab}$ | 0 | $-v_{ab}$ | $(v_a - v_c)/3$ |
|   | c a a | $-v_{ca}$ | 0 | $v_{ca}$ | $(v_a - v_b)/3$ |
|   | c b b | $v_{bc}$ | 0 | $-v_{bc}$ | $(v_b - v_a)/3$ |
|   | a b b | $-v_{ab}$ | 0 | $v_{ab}$ | $(v_b - v_c)/3$ |
| II-B | c a c | $-v_{ca}$ | $v_{ca}$ | 0 | $(v_c - v_b)/3$ |
|   | c b c | $v_{bc}$ | $-v_{bc}$ | 0 | $(v_c - v_a)/3$ |
|   | a b a | $-v_{ab}$ | $v_{ab}$ | 0 | $(v_a - v_c)/3$ |
|   | a c a | $v_{ca}$ | $-v_{ca}$ | 0 | $(v_a - v_b)/3$ |
|   | b c b | $-v_{bc}$ | $v_{bc}$ | 0 | $(v_b - v_a)/3$ |
|   | b a b | $v_{ab}$ | $-v_{ab}$ | 0 | $(v_b - v_c)/3$ |
| II-C | c a c | 0 | $v_{ca}$ | $-v_{ca}$ | $(v_c - v_b)/3$ |
|   | c b c | 0 | $-v_{bc}$ | $v_{bc}$ | $(v_c - v_a)/3$ |
|   | a b a | 0 | $v_{ab}$ | $-v_{ab}$ | $(v_a - v_c)/3$ |
|   | a c a | 0 | $-v_{ca}$ | $v_{ca}$ | $(v_a - v_b)/3$ |
|   | b c b | 0 | $v_{bc}$ | $-v_{bc}$ | $(v_b - v_a)/3$ |
|   | b a b | 0 | $-v_{ab}$ | $v_{ab}$ | $(v_b - v_c)/3$ |
| III | a a a | 0 | 0 | 0 | $v_a$ |
|   | b b b | 0 | 0 | 0 | $v_b$ |
|   | c c c | 0 | 0 | 0 | $v_c$ |

FIG. 4

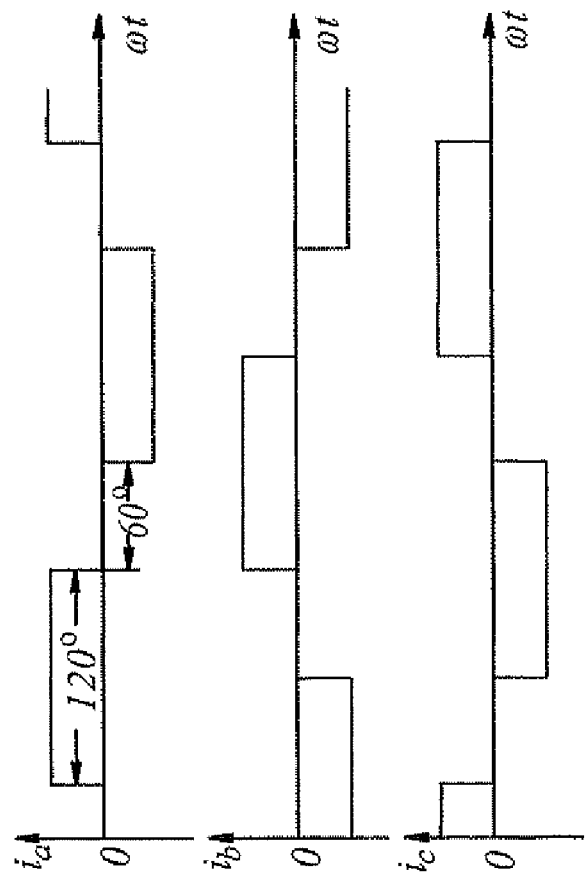
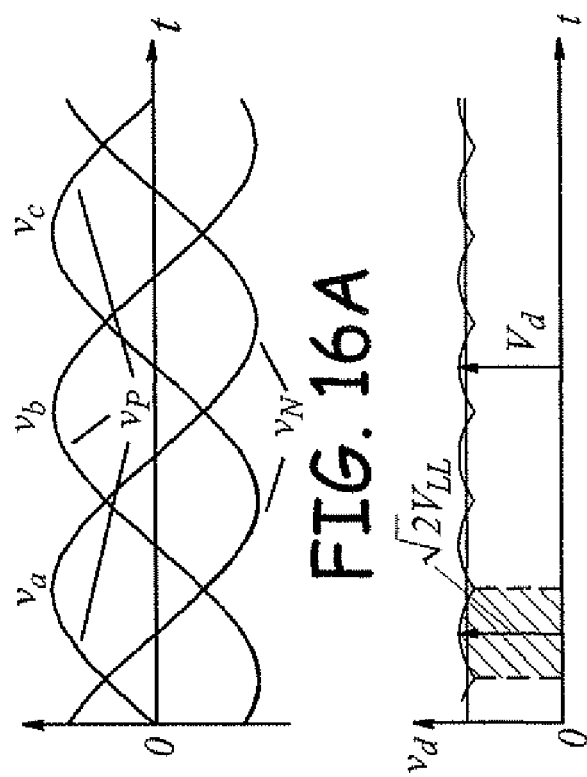
FIG. 16C
FIG. 16A
FIG. 16B

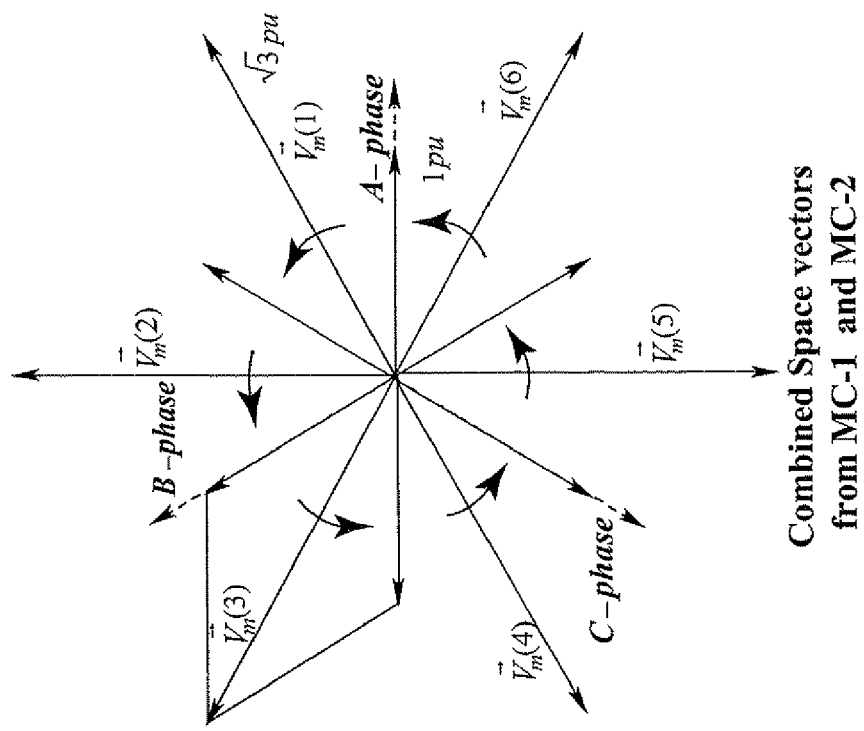
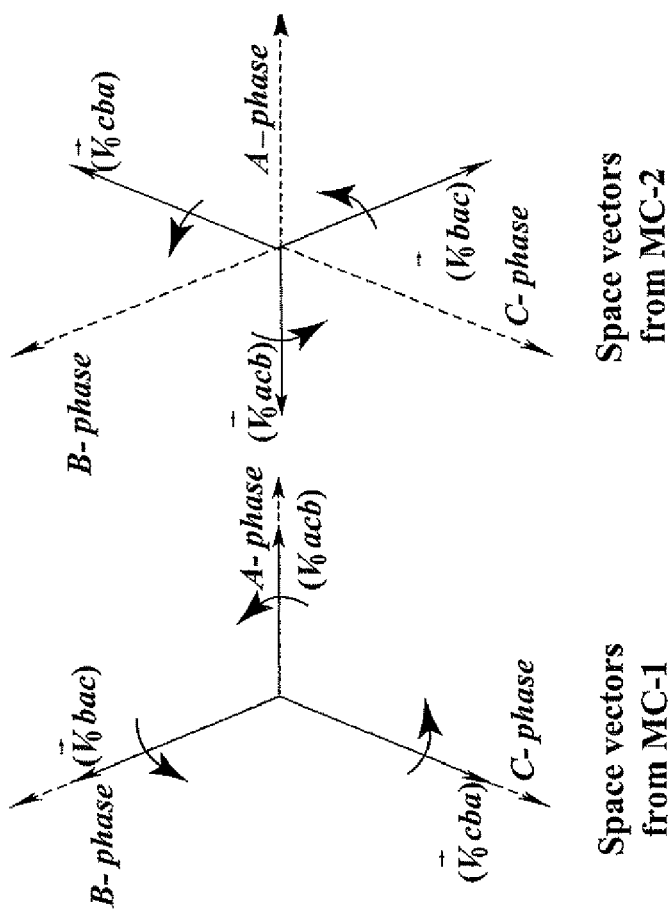
FIG. 31

OPEN-ENDED CONTROL CIRCUIT FOR ELECTRICAL APPARATUS

CROSS-REFERENCE TO RELATED APPLICATIONS

The present application is based on and claims the benefit of U.S. provisional patent applications Ser. No. 60/839,354, filed Aug. 22, 2006; 60/869,237, filed Dec. 8, 2006; and 60/891,402 filed Feb. 23, 2007, the content of each of which is hereby incorporated by reference in its entirety.

BACKGROUND

The discussion below is merely provided for general background information and is not intended to be used as an aid in determining the scope of the claimed subject matter.

In conventional induction motor drives the stator neutral is inaccessible and the stator winding is excited only from one end by a single three phase supply. In an open-ended induction motor drive, the stator neutral of the induction motor is opened and the stator winding is connected to another three phase supply at an end opposite the first-mentioned three phase supply. Thus, two sets of voltages excite the stator winding of the induction motor from both ends. Commonly, each three phase supply is derived from a two-level inverter. In consequence the stator is excited from two two-level inverters from both ends, which is equivalent to the induction motor being driven from a three-level inverter. In order to annul any zero sequence voltage induced circulating currents, appropriate measures are taken i.e. using a common mode filter or using an isolated DC-link for the two inverters. The three-level inverter has some advantages compared to the two-level inverter in terms of switching ripple and switching losses.

Although common, these systems have significant disadvantages. In particular, power for the motor originates typically from a three phase AC source such as a utility. In order to create voltages suitable for driving the motor, the power from the three phase AC source is converted to a DC source of power. The DC source of power is then used by inverters to generate suitable voltages to drive the motor. In view of this, the motor control circuit must include a converter to convert the three phase power to DC, a suitable substantial storage device (e.g. large capacitor) to temporarily store the DC power as well as an inverter to use the DC power and selectively energize the windings to drive the motor. In addition to its expense, a large storage capacitor adds additional weight, can be a reliability problem and is difficult to integrate into either the motor or the inverter. The storage capacitor also creates an inrush-current problem when the system is switched on as well as cause additional currents under input imbalance conditions. Furthermore, the peak motor phase voltage is equal to the peak value of the utility phase voltage.

A similar situation exists with power transformers. As is known, a common power transformer (e.g. 50 or 60 Hz) includes three single-phase transformers or one three-phase transformer. The disadvantage of such a transformer is its size and weight due to its low operating frequency.

In order to overcome the limitation of conventional low frequency power transformers, power electronic transformers based on voltage-link converters have been investigated. However, like the motors and generators discussed above, the configurations require a large dc-link capacitor that is bulky, unreliable and problematic at high temperatures for use with electronic switching devices such as SiC devices. Furthermore, in view of the multiple conversion stages present in these systems (i.e. AC to DC, DC to HF (high frequency) AC, HF AC to DC and DC to AC) efficiency is reduced.

SUMMARY

This Summary and the Abstract are provided to introduce some concepts in a simplified form that are further described below in the Detailed Description. The Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An AC machine control system for an AC machine (motor, generator, transformer, etc.) having open-ended windings, the control system comprising a drive circuit configured to transfer AC power between a first set of voltages and each end of the open-ended windings without the use of a substantial energy storage device, while eliminating common mode voltage and/or injecting zero sequence voltages. As used herein references to "AC" should not be interpreted to mean only sinusoidal voltages and currents, but rather voltages and currents that can take any alternating symmetrical or asymmetrical shape.

In one configuration, the control system comprises a motor drive circuit for an open-ended, multi-phase windings. The motor drive circuit includes a switching device such as a matrix converter operably connected at each end of the phase windings. Each matrix converter generates rotating voltage vectors directly from a multi-phase (e.g. 3-phase) AC source and without the need for an intermediate substantial storage device. The matrix converters are operated so as to generate synchronous rotating voltages at each end.

In one exemplary embodiment, the matrix converters are operated so as to generate multi-phase voltages having counter-clockwise (CCW) rotation at both ends, followed by clockwise (CW) rotation at both ends, for equal duration during each switch time-period. By also introducing an appropriate phase shift, the input power factor can also be controlled so as to obtain a desired value, either leading or lagging.

In a conventional two-level inverter system the utility-end converter is controlled such that the dc-link voltage is equal to be the peak line-line input voltage, that is $V_d = V_{LL,in,peak}$, while the peak insulation stress is $V_{ins} = V_{LL,in,peak}$. Moreover, the maximum motor voltage capability is 1 pu (per unit), that is, $V_{ph,m} = V_{ph,in}$. However, the same motor used with the motor control circuit herein described with the open-end windings supplied by a matrix converter at each end, provides a maximum motor voltage capability of 1.5 pu, that is $V_{ph,m} = 1.5 V_{ph,in}$, while simultaneously eliminating the common-mode voltages at both ends, which in turn eliminates the motor-bearing currents due to dv/dt caused by switching of common-mode voltages. At the same time, the peak insulation stress is only, $V_{ins,peak} = V_{ph,in,peak}$; a factor of 1.73 lower than that in the conventional system. In addition, since the proposed system can deliver the rated torque up to 1.5 pu speed, the power output capability of the motor is 150 percent of the conventional system, without exceeding the rated flux and the rated motor current. Alternatively, the system can be redesigned, requiring a smaller motor/generator than that in the conventional system.

Another aspect of the invention is a control system for energizing open-ended windings. The control system includes a drive circuit configured to transfer AC power between a first set of voltages and each end of the open-ended windings without the use of a substantial energy storage device. The drive circuit comprises three converters, wherein a first converter is coupled to the first set of voltages and a first end of the open-ended windings, a second converter is coupled to the first set of voltages and a second end of the open-ended windings, and a third converter is coupled to the first set of voltages and configured to transfer power to the first and second converters through a DC link of voltages.

Another aspect of the method for energizing open-ended windings of an AC machine, the method comprising: directly converting without the use of a substantial energy storage device multi-phase AC power to or from two sets of multi-phase AC voltages using a DC link of voltages; providing a first set of the multi-phase AC voltages to first ends of the open-ended windings; and providing a second set of the multi-phase AC voltages to second ends of the open-ended windings.

Yet another aspect of the invention is a method for energizing open-ended windings of an AC machine, the method comprising: while eliminating common mode voltage and/or injecting zero sequence voltages, directly converting without the use of a substantial energy storage device multi-phase AC power to or from two sets of multi-phase AC voltages; providing a first set of the multi-phase AC voltages to first ends of the open-ended windings; and providing a second set of the multi-phase AC voltages to second ends of the open-ended windings.

BRIEF DESCRIPTION OF THE DRAWINGS

FIG. 4 is a table listing possible switching combinations and corresponding common mode voltages in a three-phase matrix converter.

FIG. 16A illustrates a set of three phase voltages.

FIG. 16B illustrates a time-varying dc voltage.

FIG. 16C illustrates nearly rectangular three phase currents.

FIG. 31 illustrates a first set of rotating vectors that can be generated from the matrix converters of FIG. 30.

DETAILED DESCRIPTION OF THE ILLUSTRATIVE EMBODIMENTS

Figure 1:
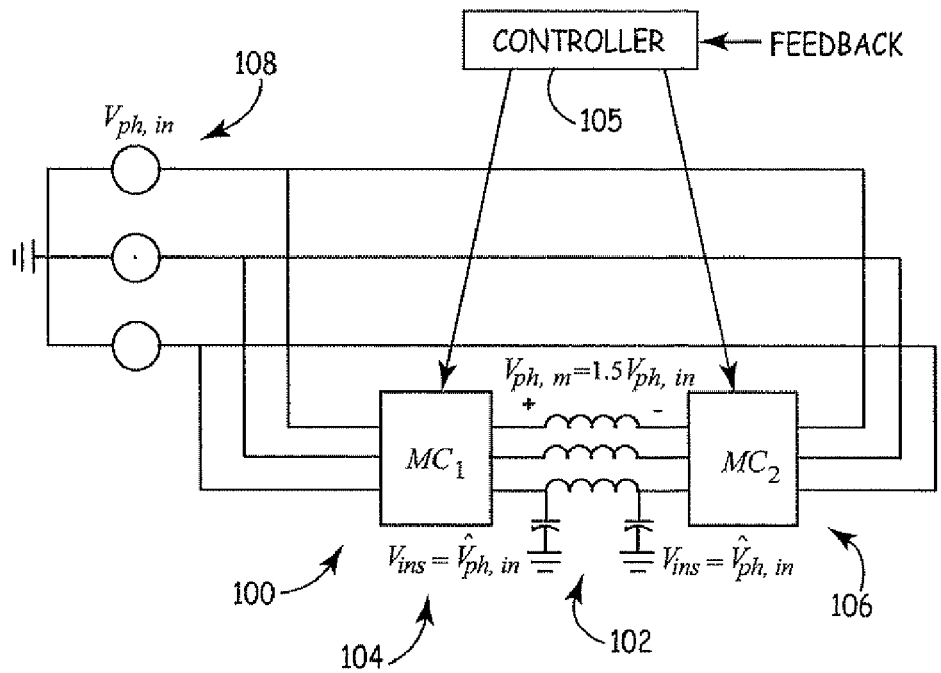
FIG. 1 illustrates a first exemplary embodiment of the switching assembly which includes two matrix converters.
Figure 1A:
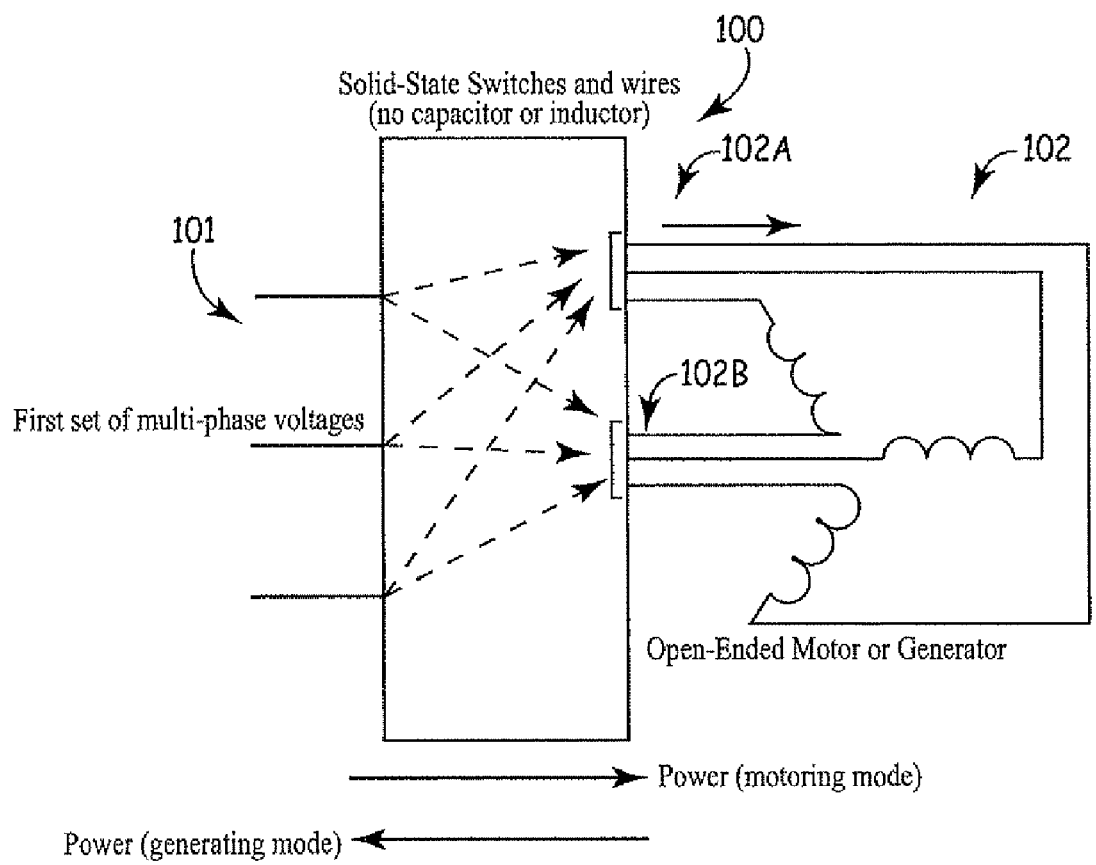
FIG. 1A illustrates a drive circuit or switching assembly for an open-ended, multi-phase AC machine.

FIG. 1A illustrates generally a drive circuit 100 (i.e. switching assembly) for an open-ended, multi-phase (defined herein as two or more phases) AC machine 102, which can be one or more motors, one or more generators and/or one or more transformers connected in series and/or parallel. In other words, it should be understood that the present invention is not limited to a single AC machine, but rather AC machine 102 illustrated in the Figures represents one or more AC machines (motor, generator and/or transformer) connected in series and/or parallel. The drive circuit 100 can take many forms examples of which will be described below. However generally, drive circuit 100 includes switches (e.g. solid state switches) configured so as to directly switch power to or from each phase of each end 102A, 102B of the AC machine 102 with respect to each phase of a first set of voltages 101 without the use of a substantial energy storage device such as a capacitor or inductor typically used in known drive circuits to store sufficient energy in order to realize one (or more) DC voltage or substantially DC voltage. As appreciated by those skilled in the art, a snubber capacitor commonly found in clamp circuits may still be used; however, such snubber capacitors are not a "substantial" energy storage device because such capacitors are not used to store sufficient in order to realize one (or more) DC voltage or substantially DC voltage. Stated another way, with respect to the AC machine 102 being a motor, drive circuit 100 includes switches configured so as to receive power from a source providing the first set of voltages 101 and directly switch the first set of voltages 101 to excite each end 102A, 102B of the AC machine 102 without a substantial storage device. With respect to the AC machine being a generator, drive circuit 100 includes switches configured so as to receive power from each end 102A, 102B and directly generate the first set of voltages 101 without a substantial storage device. Stated yet another way, the drive circuit comprises one or more converters that transfer AC power between (energizing a load or obtaining power from a generator) each end of a dual open-ended AC machine and a set of first AC voltages without the use of a substantial energy storage device such as a capacitor or inductor.

Stated yet another way, control of the drive circuit 100 is such that the first set of multi-phase voltages are connected to two sets of multi-phase voltages, at the terminals of the AC machine, by switches (e.g. solid-state switches) without energy storage capacitors and inductors such that all currents at the two sets of multi-phase terminals always have paths to flow to the first set of multi-phase voltages.

In the embodiments described below matrix converters, DC matrix converters or inverters will be described. As used herein, these devices are all generally "converters" of voltages, where matrix converters can block bi-directional voltages while converting AC voltages to AC voltages, DC matrix converters can block bi-directional voltages while converting AC voltages to repeating, fluctuating or pulsating DC voltages, and inverters convert AC voltages to repeating, fluctuating or pulsating DC voltages, or vice versa from fluctuating or pulsating DC voltages to AC voltages.

It should be also noted that the AC machine 102 is not limited to one having only energized stator windings, but also and/or energized rotor windings. In other words, motor and generator windings (either on the stator or the rotor) can be originally wye-connected or delta-connected, and they can be modified to be open-ended so they can be supplied from both sides. Furthermore, all the embodiments described for the stator windings, where the power flow is bidirectional, can be applied in the rotor circuit of a doubly-fed induction machine.

Matrix Converters on Each Side of Open-Ended Machine

FIG. 1 illustrates a first exemplary embodiment of motor drive circuit 100 which includes two matrix converters 104, 106 operably connected at each end of the phase windings. Each matrix converter 104, 106 generates rotating voltage vectors directly from a multi-phase (e.g. 3-phase) AC source 108 and without the need for an intermediate substantial storage device. The matrix converters 104, 106 can be operated so as to generate synchronous rotating voltages at each end.

A controller 105 controls the switches of the matrix converters 104, 106 (or any of the other devices (e.g. other matrix converters, DC matrix conveter, inverters, switches etc. described below) and can receive feedback parameters such as current(s) and voltages(s) from parts of or the entire system as needed. Controller 105 can be configured to as necessary to operate in each of the embodiments described below.

Figure 2:
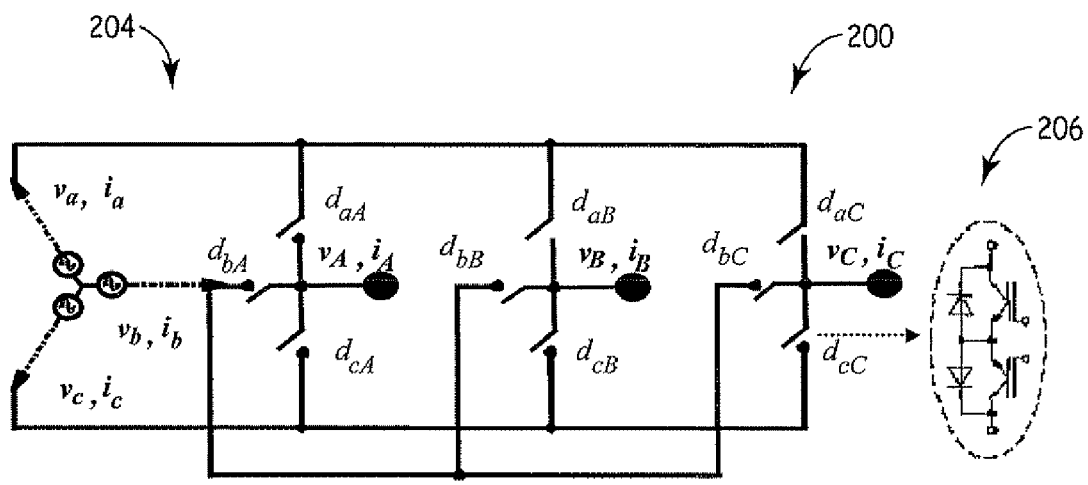
FIG. 2 is a schematic diagram of an exemplary matrix converter used for generating three phase output voltages based on a set of three phase input voltages.

Matrix converters are well known switching devices that are used to generate multi-phase output voltages directly from a set of multi-phase input voltages; however, a brief description will be provided herein. Referring to FIG. 2, a matrix converter 200 used for generating three phase output voltages based on a set of three phase input voltages, by way of example and not limitation, can include nine four-quadrant switches, which enable any of the three output phases to be connected to any of the three input phases. A four-quadrant switch 206 can conduct in either direction when it is on, and can block voltages in either direction when it is off. Generally the four-quadrant switch can be realized from unidirectional switches with anti-parallel diodes, by connecting them in anti-series. Matrix converter bi-directional switches can also be implemented by connecting reverse-blocking IGBTs (Insulated Gate Bi-polar Transistors) in anti-parallel.

In the exemplary matrix converter of FIG. 2, the input voltages are three-phase AC. Every output phase of the matrix converter is connected to the three-phase input through three four-quadrant switches 204. By having proper duty ratios for each switch, desired output voltages can be realized from the input phase voltages. For phase-A, the duty-ratios of the three switches in FIG. 2 are $d_{aA}$, $d_{bA}$, and $d_{cA}$ respectively. Similar duty-ratios defined for the output phase-B are $d_{aB}$, $d_{bB}$, and $d_{cB}$ and for output phase-C are $d_{aC}$, $d_{bC}$, and $d_{cC}$.

Figure 3:
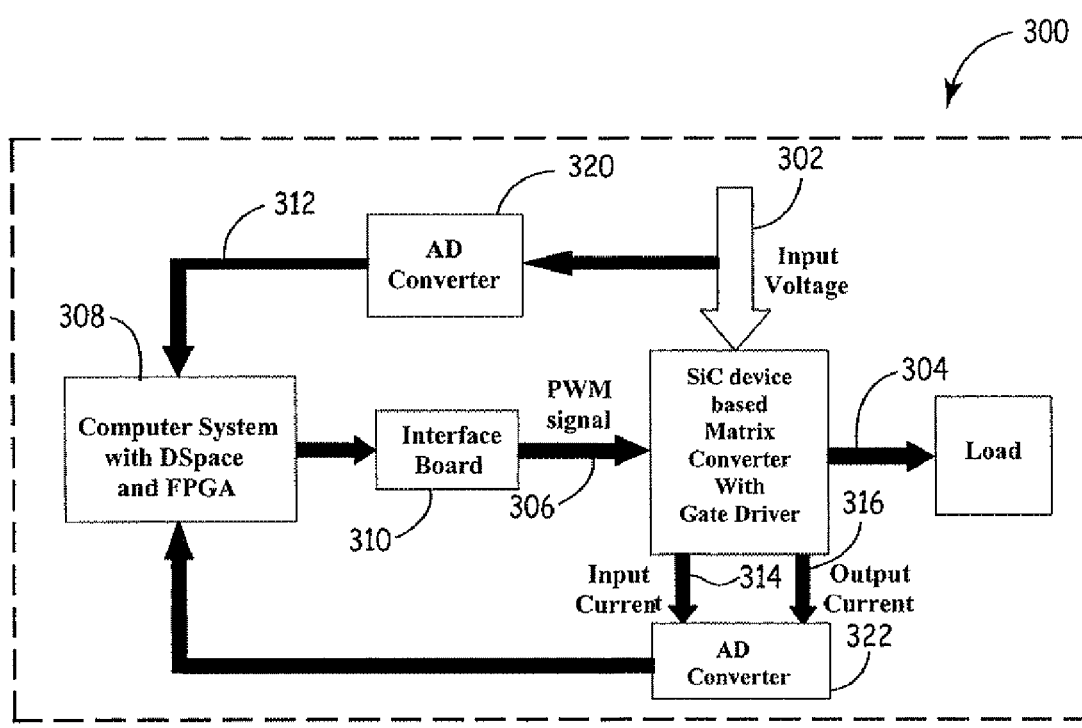
FIG. 3 illustrates in block diagram for components of an exemplary matrix converter system.

FIG. 3 illustrates in block diagram components of an exemplary matrix converter system 300 (or elements that can form part of the controller 105). A matrix converter such as but not limited to SiC switching devices receives multi-phase AC input voltages 302 and directly generates multi-phase AC output voltages 304 based on control signals commonly in the form of pulse-width modulated (PWM) signals 306. The PWM signals 306 are based on signals from a controller 308 (e.g. DSpace and FPGA) and a suitable interface board 310, which in turn generates the PWM signals 306. The controller 300 can operate based on sensed input current 314 (optional), output current 316 (optional) and input voltage levels 312 suitably converted to digital representations using analog-to-digital (AD) converters 320, 322.

It should be understood that the topologies of the matrix converter of FIG. 2 and the matrix converter system of FIG. 3 are merely exemplary and that other topologies can be used as appreciated by those skilled in the art.

As indicated above, one embodiment herein described includes using two matrix converters 104, 106 as illustrated in FIG. 1, where one matrix converter drives each end of the stator winding of an AC machine 102 such as but not limited to an induction motor. Or equivalently the system is driven by two independent matrix converters. Thus the net voltage vector across the stator winding is a linear combination of voltage vectors generated from the individual matrix converters.

In a conventional single matrix converter system, energizing windings of a three-phase load generates zero sequence common mode potential in the motor windings with respect to the source neutral. In one embodiment, when the AC machine such as an induction motor is driven from two matrix converters from opposite ends of the stator winding as illustrated in FIG. 1, the common mode potential generated from each individual matrix converter must be zero in order to eliminate switching of common mode voltages, applied to the stator winding, since switching of common mode voltages causes bearing currents.

There are total of 27 possible switching combinations in a three-phase matrix converter. Each switching combination corresponds to a voltage vector at the output of the AC machine. All possible switching and the corresponding common mode voltages are listed in Table-1 of FIG. 4. As shown in Table-1 there are three groups of switching combinations. In conventional matrix converter modulation the second group of switching combinations (II-A, II-B, and II-C) are used. The second group of switching combination generates maximum possible output voltage vector; however this switching combination also inherently generates significant amount of common mode potential at output. The third group of switching combinations has maximum common mode voltage and produces zero output voltage. This combination is used for controlling the output voltage amplitude.

The first group (Group-I) of switching combinations shown in TABLE-1 generates null common mode voltage and finite amounts of output voltage vector. Thus output voltage generation from the first group of switching combinations is a viable option for PWM generation with zero common mode voltage.

Figure 5:
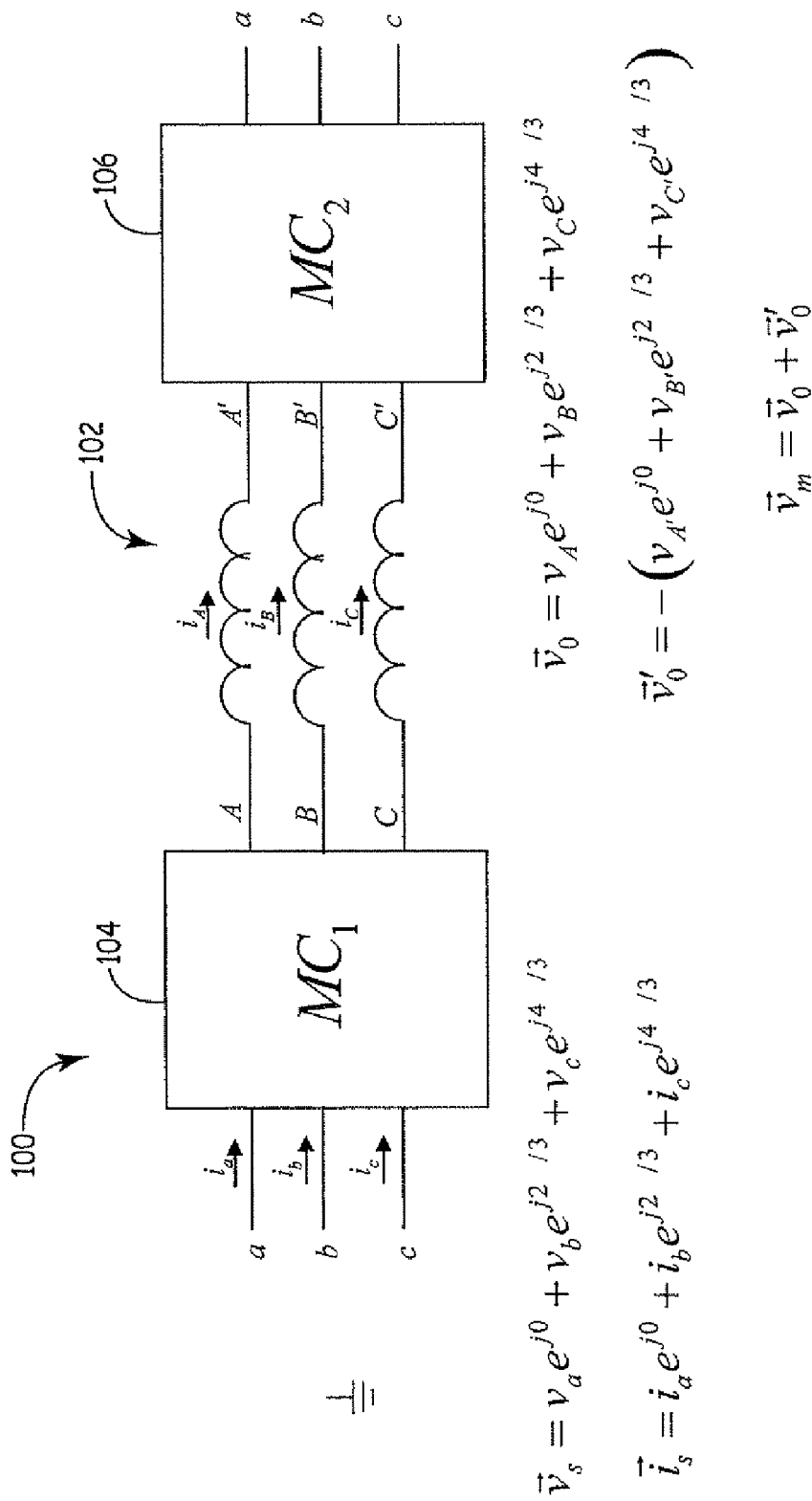
FIG. 5 illustrates voltages and currents for the exemplary system of FIG. 1.

FIG. 5 illustrates voltages and currents for the exemplary system 100 of FIG. 1. In FIG. 5 lower case letters (a, b, and c) are used to designate voltages and currents for the source of AC power, while capital letters (A, B, and C) are used to designate output voltages from each of the converters (unprimed and primed) and currents flowing in the phase windings of the AC machine.

Briefly, a matrix converter generates rotating voltage vectors directly from a multi-phase (e.g. 3-phase) AC source and without the need for an intermediate substantial storage device. In particular, for the switching combinations abc, cab and bca, the matrix converter generates vectors with angular displacement of $\theta$, $\theta+2\pi/3$ and $\theta+4\pi/3$, respectively, at any instant $\theta=\omega t$, where $\omega$ is the angular frequency at input side and t is the time. With any of these switching combinations, the generated voltage vector always rotates in anti-clockwise direction with angular speed equal to the input side angular frequency $\omega$.

Figure 6:
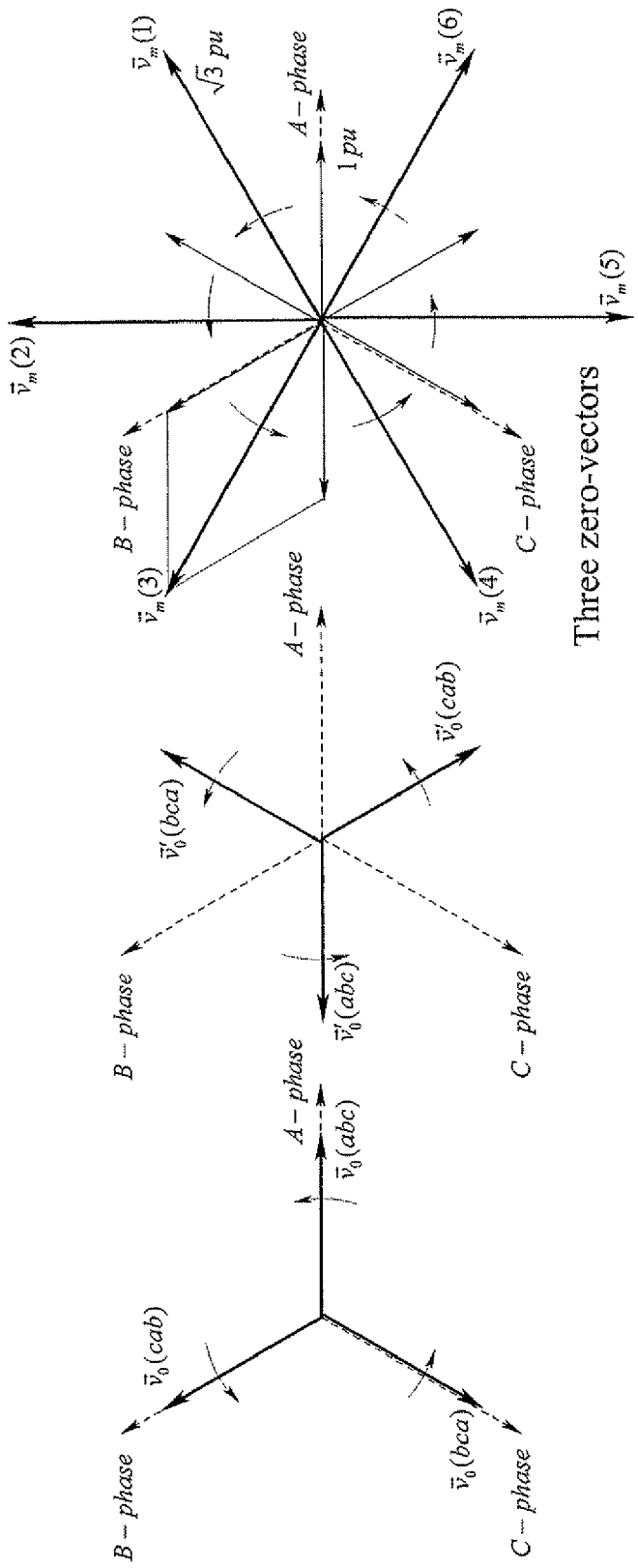
FIG. 6 pictorially illustrates a first embodiment of a set of voltage vectors from each of the matrix converters of FIG. 1 and the resulting combination across the windings of the AC machine.

Referring to FIGS. 1 and 6 in the open-ended AC machine a matrix converter is connected to each side of the stator winding. Each of the set of voltage vectors from each of the matrix converters is illustrated in FIG. 6. It can be observed from FIG. 6 that the set of voltage vectors generated from switching combinations abc, cab and bca of the second matrix converter, because they are applied to the opposite ends of the motor windings, are 180° phase displaced from the set of voltage vectors generated from switching combinations abc, cab and bca of first matrix converter.

FIG. 6 further illustrates that the two sets of voltage vectors, from the two matrix converters, combine vectorially to result in an output vector of motor voltages as shown, across the windings of the AC machine. Six such motor voltages can be obtained as shown. In addition, three zero-vectors without common mode voltages can be generated for controlling the motor voltage amplitude. Each of these voltage vectors rotates at angular speed of $\omega$ counter-clockwise around the origin with respect to the stator reference frame of the AC machine 102.

In a manner similar to that described above and illustrated in FIG. 7, the three switching combinations acb, bac and cba of the first matrix converter form another set of voltage vectors whose angular displacements are $-\theta$, $-\theta+2\pi/3$ and $-\theta+4\pi/3$, respectively. The generated vectors from any of these switching combinations always rotate in clockwise direction with an angular frequency of $\omega$. Another set of voltage vectors generated from switching combinations acb, bac and cba from the second matrix converter also rotate in clockwise direction. For any particular switching combination the generated voltage vector from the first matrix converter is always 180° phase displaced from the vector generated from the second matrix converter.

Figure 7:
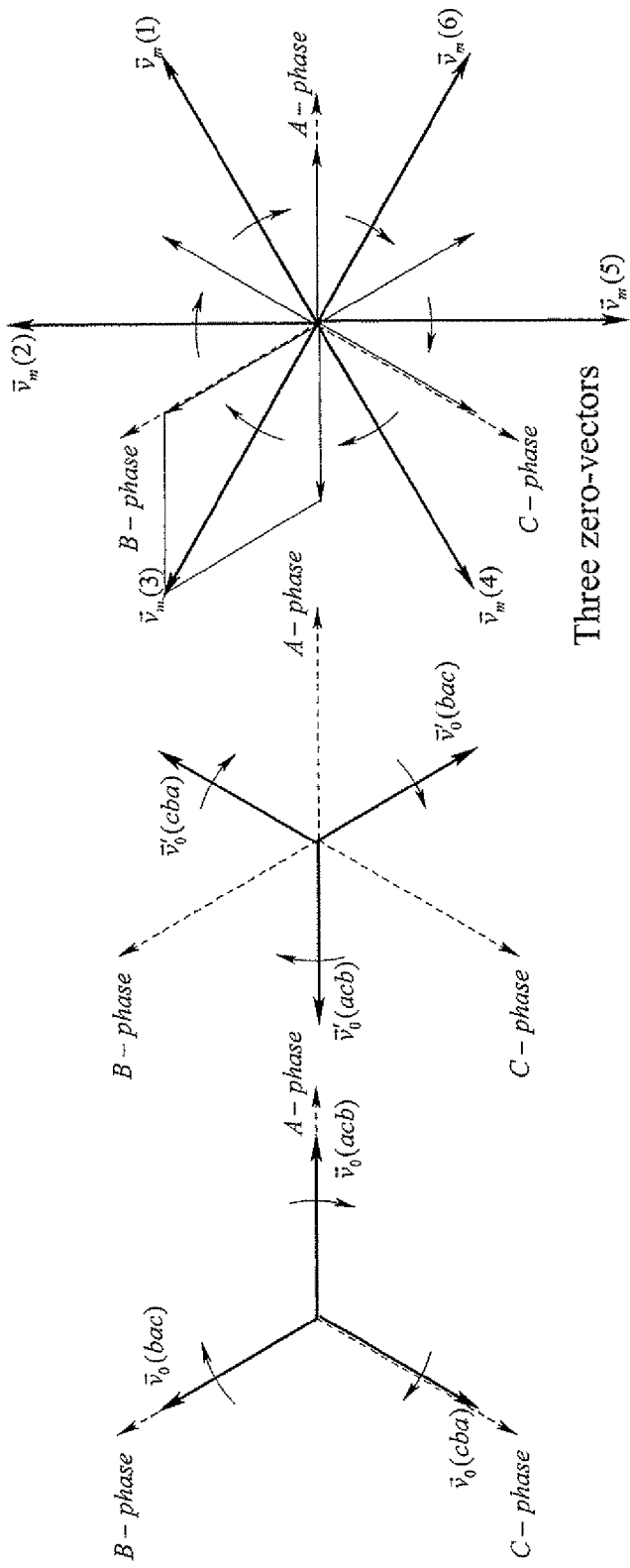
FIG. 7 pictorially illustrates a second embodiment of a set of voltage vectors from each of the matrix converters of FIG. 1 and the resulting combination across the windings of the AC machine.

FIG. 7 further illustrates that by combining any two voltage vectors picked separately from the two set of clockwise rotating voltage vectors a set consisting of nine vectors are obtained across the windings of the AC machine. Out of them three are zero vectors, which are used for controlling motor voltage amplitude. Each of the voltage vectors rotate at angular speed of $\omega$ clockwise around the origin with respect to the stator phases of the AC machine.

Therefore using the available switching combinations two sets of output space vectors rotating in opposite direction are obtained for generation of output voltage vector (FIG. 6 and FIG. 7) across the windings of the AC machine. It should be noted that any one of the two output voltage sets (rotating counterclockwise or clockwise) across the windings of the AC machine is capable of producing the desirable output. The amplitude of the vectors belonging to the switching combinations (abc, cab and bca) and (acb, bac and cba) is same as the input voltage vector amplitude which is equal to 3/2V, where V is the amplitude of the input phase voltage. Thus, the amplitude of the resultant voltage vector generated by combining the voltage vectors of both converters (FIG. 6 and FIG. 7) equals ($\sqrt{3} \times 3/2V$). Therefore, the maximum possible amplitude of the voltage vector across the windings of the AC machine realizable by any conventional PWM scheme is equal to ($\sqrt{3}/2 \times \sqrt{3} \times 3/2V$), which is 3/2 times the input voltage vector amplitude.

Utility-Side Power Factor Control

When only one of the two sets of output vectors is used for space vector generation the input power factor is not controllable. If the direction of rotation of the resultant output vector coincides with the direction of rotation of the set of vectors generating it, then the input power factor is equal to the motor power factor. Otherwise, the input power factor is negative (opposite) of the motor power factor. By using the counter-clockwise (CCW) rotating vectors and clockwise (CW) rotating vectors in appropriate ratio for generation of resultant output voltage vector, the input power factor can be controlled in any range. If the output vectors generated from both CCW and CW rotating vectors are same in phase and amplitude during a switching period the input power factor is equal to unity. If controlling the input power factor is not the objective and it is sufficient to operate at either equal or opposite (negative) of the motor power factor, then this property can be used to reduce the switchings and hence the switching losses to one-half compared to a scheme where the input power factor is controlled. Like the unity input power factor operation described in the next paragraph, using a single set of vectors, the output voltage capability is not diminished and elimination of common mode voltages is achieved.

In order to control the input power factor both sets of output vectors need to be used for generation of the resultant output vector. In one embodiment, voltage vectors are applied such that the power factor seen by the utility is either controlled to be unity or leading or lagging. In particular, this can be accomplished by applying voltage vectors having CCW rotation at both ends, followed by voltage vectors having CW rotation at both ends. In one embodiment, this technique is applied for equal duration during each switch time-period (in this case, the frequency of switching between CCW and CW vectors is the same as the switching frequency of the output voltage. By introducing appropriate phase shift, the input power factor can be controlled to a desired value, either leading or lagging. However the maximum output voltage capability is reduced compared to the case where the input power factor is controlled to be unity.

Using phase shift to control the input power factor will now be described. If the utility side angular frequency is equal to $\omega$, at any instant the angular displacement of utility side voltage vector is equal to $\theta = \omega t$. In the output side the counterclockwise (CCW) rotating voltage vectors of FIG. 6 rotate with an angular frequency equal to $\omega$ in CCW direction and the clockwise (CW) rotating voltage vectors of FIG. 7 rotate in opposite direction inside the machine. Similarly if the output side angular frequency is equal to $\omega_o$, at any instant the angular displacement of the machine side current vector is equal to $\theta_o = \omega_o t - \rho$, where t is the time and $\rho$ is the output power factor. Correspondingly the switching configurations generating the rotating voltage vectors of FIG. 6 will produce a set of current vectors rotating with angular speed of $\omega_o$ and that of FIG. 7 will produce current vectors rotating with angular speed of $-\omega_o$ at the utility side.

Figure 8:
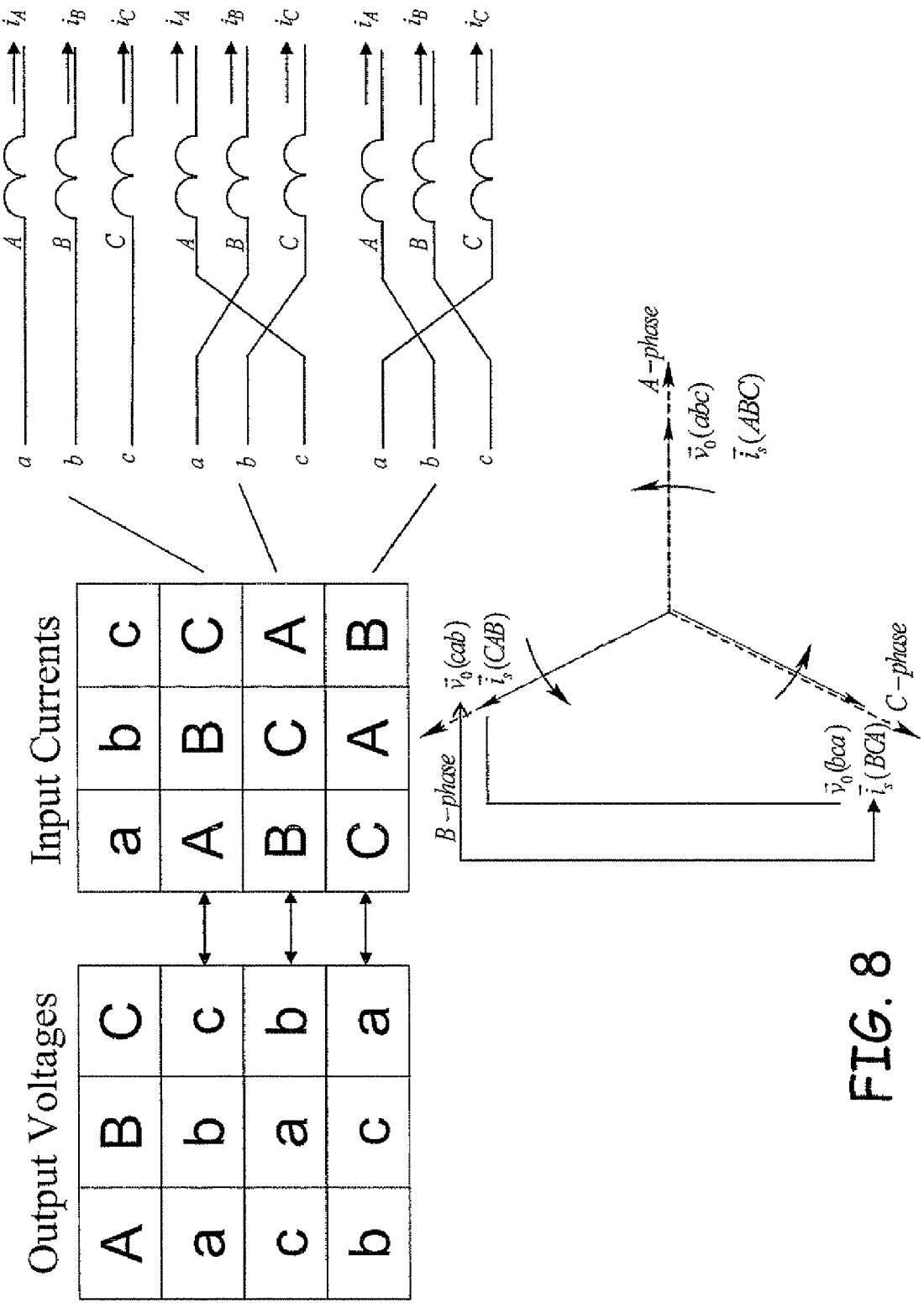
FIG. 8 illustrates a connectivity matrix showing output phase voltages in terms of the input phase voltages, and input phase currents in terms of the output phase currents when CCW rotating vectors of FIG. 6 are used.
Figure 9:
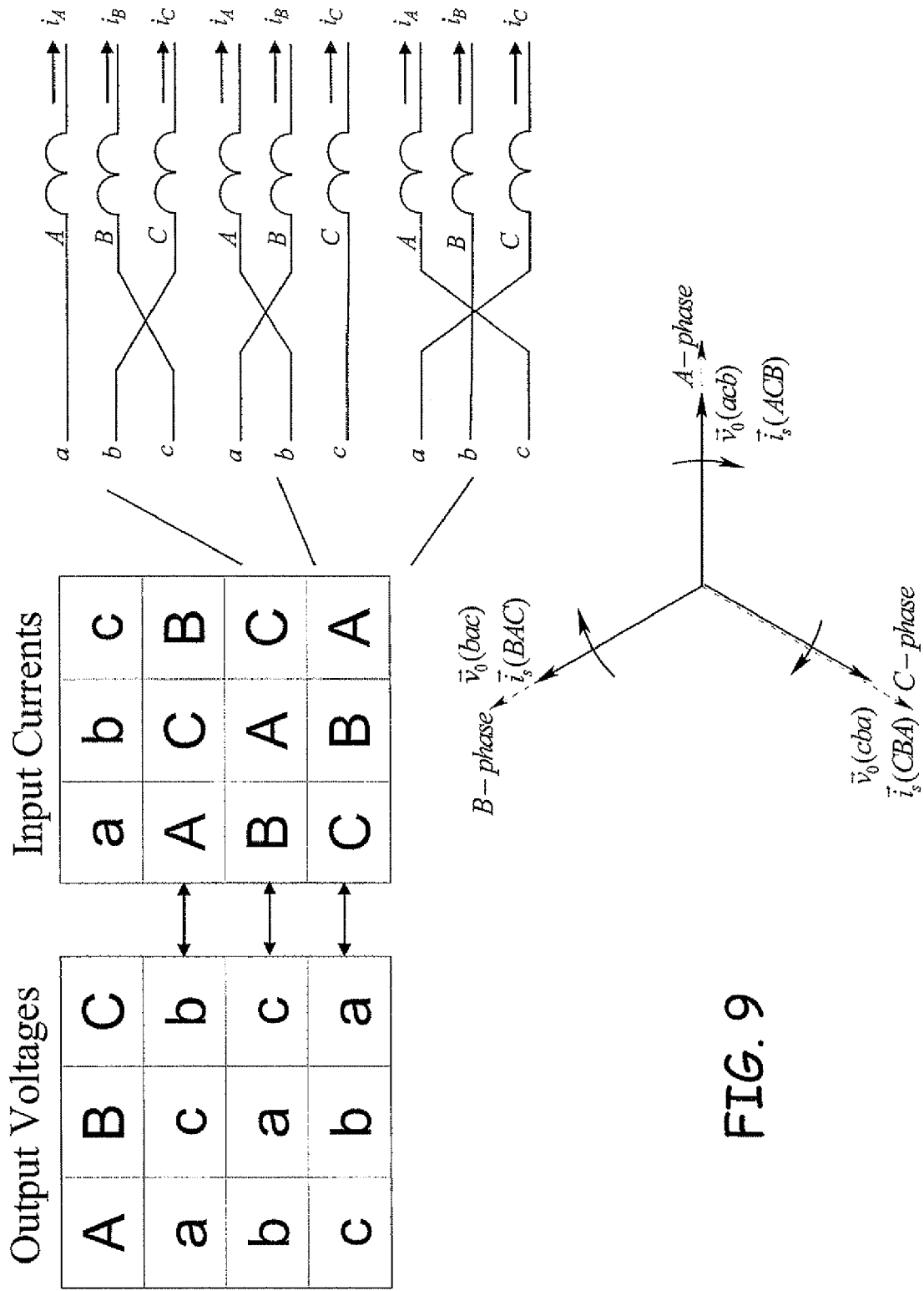
FIG. 9 illustrates a connectivity matrix showing output phase voltages in terms of the input phase voltages, and input phase currents in terms of the output phase currents when CW rotating vectors of FIG. 7 are used.

Using phase control, the input power factor can be controllable in any range. FIG. 8 illustrates a connectivity matrix showing output phase voltages in terms of the input phase voltages, and input phase currents in terms of the output phase currents when CCW rotating vectors of FIG. 6 are used. Similarly, FIG. 9 shows the relationship between input and output when CW rotating vectors of FIG. 7 are used.

Figure 10A:
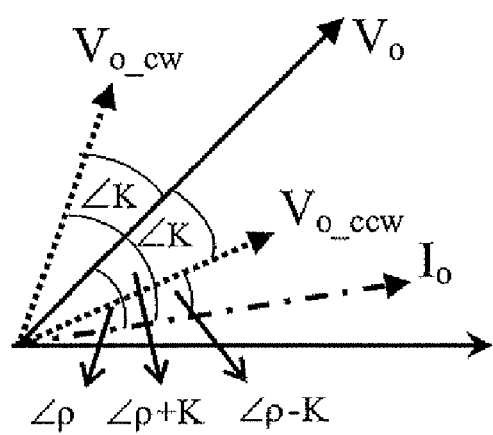
FIG. 10A pictorially illustrates the relationship between output voltage and output current.

In FIG. 10a the relationship between output voltage and output current is shown. The output $V_{o\_ccw}$, generated from CCW vectors lags by a phase of $\angle K$ from the resultant output voltage $V_o$ in counter clockwise direction and the output $V_{o\_cw}$, generated from CW rotating vectors lags by a phase of $\angle K$ from $V_o$ in clockwise direction. Both $V_{o\_ccw}$ and $V_{o\_cw}$ have equal amplitude.

The output current $I_o$ lags the resultant output $V_o$ by a phase $\angle \rho$ in ccw direction.

$$\text{Thus } V_o = V_{o\_ccw} \cos(K) = V_{o\_cw} \cos(K) \quad \text{Equ. (1)}$$

Therefore Io lags $V_{o\_ccw}$ by $\angle \rho - K$ in counter-clockwise direction and lags $V_{o\_cw}$ by $\angle \rho + K$ in clockwise direction.

Figure 10B:
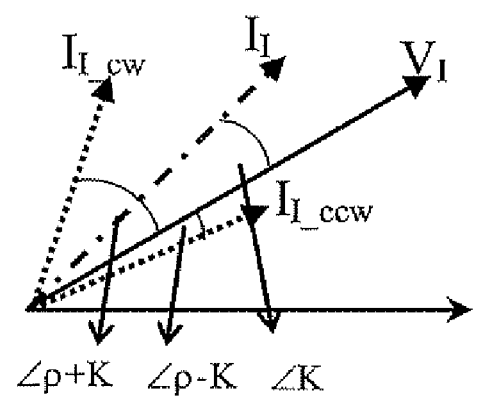
FIG. 10B pictorially illustrates the relationship between input voltage and input current.

The corresponding input side voltage and current are shown in FIG. 10b. The input voltage vector $V_I$ rotates in CCW direction. The reflected input current $I_{I\_ccw}$ due to $V_{o\_ccw}$ lags the input voltage vector $V_I$ by $\angle \rho - L$ in the CCW direction. The reflected input current $I_{I\_cw}$ due to $V_{o\_cw}$ would lag the input voltage vector $V_I$ by $\angle \rho + K$ in the CW direction which implies $I_{I\_cw}$ leads $V_I$ by $\angle \rho + K$ in CCW direction.

Therefore the resultant input current $I_I$ leads the input voltage $V_I$ by $(\angle \rho + K - \angle \rho - K)/2$ i.e. $\angle K$. Thus the input power factor and output power factor are independent of each other and by maintaining power balance $$V_I I_I \cos(K) = V_o I_o \cos(\rho) \quad \text{Equ. (2)}$$

By varying $\angle K$ the input power factor is controllable in any range. But by operating at non unity power factor the output amplitude is limited to $\cos(K)$ of maximum possible output. By making $\angle K = $ zero unity power factor operation is achieved.

There is yet another way to control the input power factor without reducing the output voltage capability, provided the input power factor is to be controlled within a range that spans the motor power factor and negative of the motor power factor. In this range, without introducing the phase shift, the sets of CCW and CW vectors can be used in an appropriate ratio to yield the desired input power factor.

Switching between CCW and CW voltage vectors results in switching losses. In controlling the input power factor, switching losses can be minimized, without affecting the output voltage ripple, by transitioning between CCW and CW at a lower frequency, irrespective of the desired input power factor and the method of achieving it. To reduce switching losses where there are a collection of drives, one-half the drives may be operated using CCW rotating vectors and the other one-half using CW rotating vectors, thus resulting in a combined power factor that is essentially unity. Of course, it is possible to obtain the combined power factor to be leading or lagging by unequal distribution of drives using CCW and CW rotating vectors.

Figure 11A:
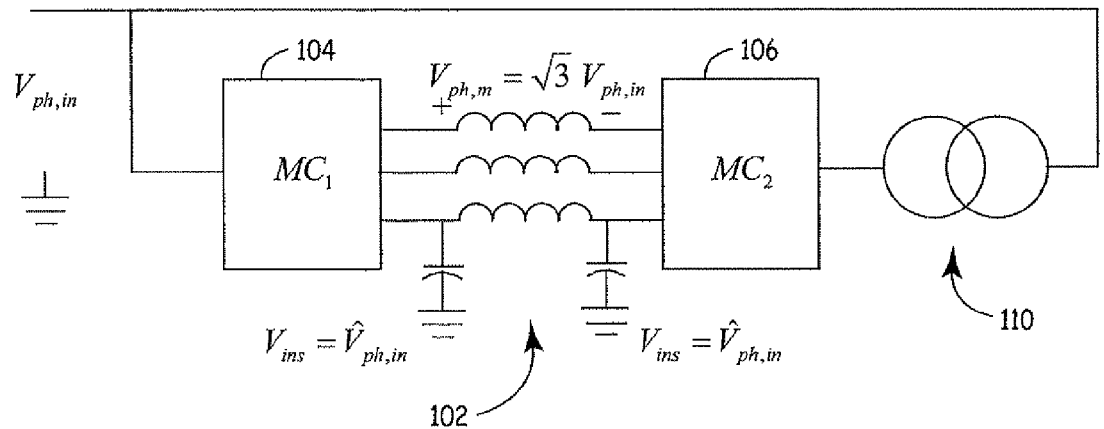
FIG. 11A illustrates a first embodiment having an isolation transformer.
Figure 11B:
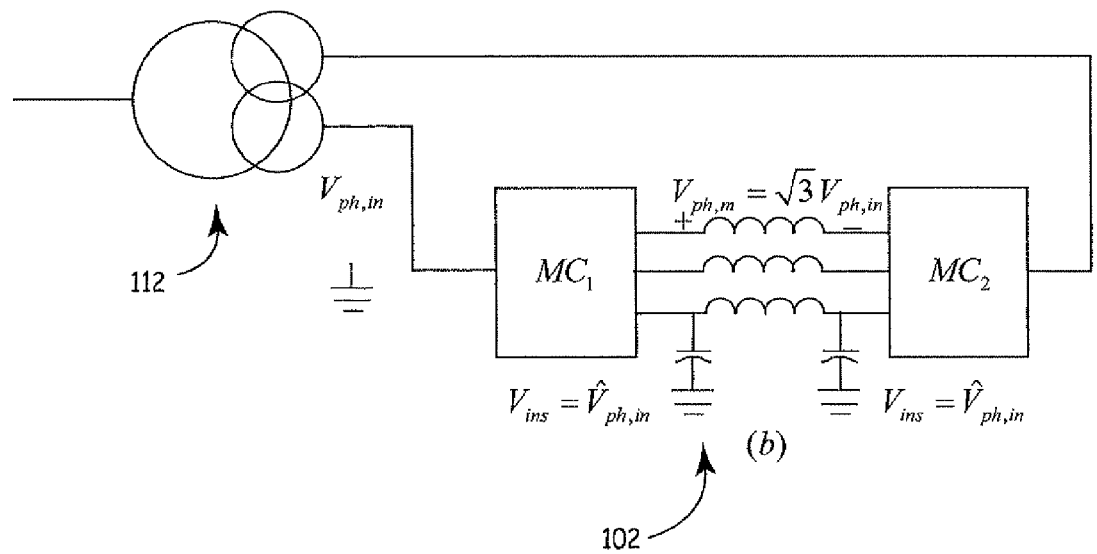
FIG. 11B illustrates a first embodiment having an isolation transformer.

In the system 100 of FIG. 1, there is no isolation between inputs of the matrix converters 104, 106. As indicated above, this configuration provides a system that can achieve a machine voltage of 1.5 pu, while simultaneously eliminating bearing currents and keeping the slot insulation of the AC machine at 1 pu. However, in a further embodiment illustrated in FIG. 11, a machine voltage as high as $\sqrt{3}$ pu can be achieved through isolation of the inputs to the matrix converters. In FIG. 11A, isolation is achieved through an isolation transformer 110. However, in a further embodiment as illustrated in FIG. 11B where the primary voltage is high and must be reduced, a step-down transformer 112 can provide the requisite isolation. As appreciated by those skilled in the art other techniques can be used to provide isolation. If desired, control of the system can be as described in Chapter 12 of First Course on Power Electronics by Ned Mohan, published by MNPERE, 2005 or K. Mohapatra et al., entitled "A Novel Carrier-Based PWM Scheme for Matrix Converters that is Easy to Implement," Conf. record IEEE 36th PESC, June 2005, pp. 2410-2414. But the enhanced output described with the isolated system is achieved at the expense of finite common mode voltage.

It is easy to show how $\sqrt{3}$ pu machine voltage is achieved in the systems of FIG. 11. The output voltage of a matrix converter is $\sqrt{3}/2(=0.866)$ pu. Since the output of the two matrix converters in FIG. 11a or FIG. 11B can be phase shifted by 180 degrees with respect to each other in the manner described above, the AC machine phase voltage, which is the difference of the two matrix converter outputs, will be twice that of a single matrix converter output, that is $\sqrt{3}$ pu. However, it should be noted common-mode voltages will be present on both sides and hence the bearing currents are not eliminated in the configurations of FIGS. 11A and 11B. Nevertheless, the slot insulation remains at 1 pu. In other words, where the insulation of the windings of an AC machine in a conventional configuration such as where a single matrix converter or two-level inverter system is used must be rated to handle line-to-line voltage, in the configurations of FIG. 1 or FIG. 11, the insulation need withstand only phase voltages, which are 1.73 times lower than that of line-to-line voltages. In this manner, the manufacturing costs of the AC machine are lowered.

Using a wye-wye and a wye-delta configuration for transformer 112 in FIG. 11B results in a 30 degree phase shift in the input voltages of the two converters 104, 106. Therefore, the maximum output voltage capability increases to 1.8667 per unit.

Just like in non-isolated topology, in transformer-isolated topologies, it is also possible to eliminate common mode voltages. However, the maximum voltage capability can be limited to 1.5 per unit, just like in non-isolated topology.

When the motor voltage required to be generated is less than 0.866 per unit, it is possible to reduce switching losses to one-half by closing all the switches in one of the converters 104, 106 to connect all three windings in a neutral on that side of motor 102, and isolating the ac voltages to that converter by isolation switches (mechanical or solid-state), one in each phase. These switches to isolate are not required in case of a transformer-isolated topology, where it is sufficient in that converter to close all three switches corresponding to one of the input ac phases, and open all the switches corresponding to the other two input phases. However, it should be noted common-mode voltages will not be eliminated.

As indicated above, the matrix converters can be configured to operate the AC machine as a motor as described above, or can be configured to provide AC multi-phase power when the AC machine operates as a generator as appreciated by those skilled in the art.

It should be noted that the ac inputs to the two individual matrix converters 104, 106 may be from two sources of different amplitude and frequency. These two sets of three-phase ac inputs can be combined to yield a resultant voltage applied to the motor. It will be possible to eliminate the common mode voltage and the input power factor can be controlled individually for each of the two sources.

Some advantages and unique features of the system and method herein described include, but are not limited to:
1. Matrix converters without dc-link capacitors are used at both ends.
2. It is possible to eliminate common mode voltages, hence the bearing currents.
3. No increase in Slot insulation
4. Voltage capability in non-isolated topology, while eliminating common-mode voltages, can be increased to 1.5 per unit.
5. Voltage capability in isolated topologies can be increased to $\sqrt{3}(=1.73)$ per unit.
6. Voltage capability in isolated topologies using a wye-delta transformation can be increased to 1.866 per unit.
7. The power in per unit that such a drive can generate (as a motor or as a generator) in per unit is the same as the maximum voltage capability in per unit.
8. Input power factor is controllable.
9. It is possible to use only one converter, in case of a fault, or to reduce switching losses to one-half, if the required output voltage is less than 0.866 per unit, without common mode elimination (less than 0.5 per unit if the common mode voltages are to be eliminated).

Figure 12:
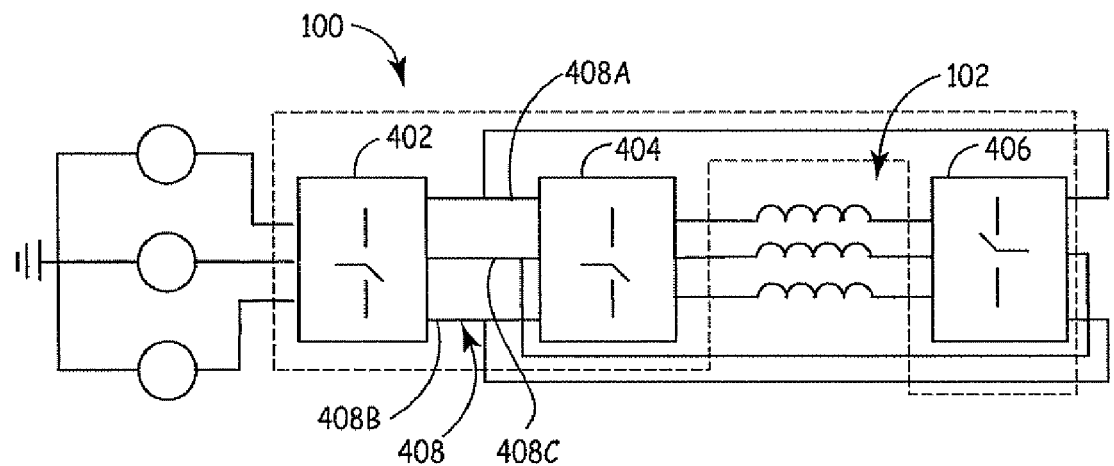
FIG. 12 illustrates a second exemplary embodiment of the switching assembly which includes three, three-level inverters.

Another embodiment of drive circuit 100 is illustrated in FIG. 12. In this embodiment three, three-level inverters 402, 404 and 406 are used where inverter 402 receives input power/provides output voltages and inverters 404 and 406 are connected on each end of the AC machine, which can be operated as either a motor or generator. This embodiment also does not use any substantial energy storage device as well as has the same resulting performance of 1.5 pu voltage capability, no common-mode voltage and power factor control as described in the previous embodiment.

At this point it should be noted that a small storage device (similar to the snubber capacitor described above, e.g. nanofarad capacitor) could be included between inverter 402 and inverters 404 and 406 (as well as in further embodiments discussed below), which would not significantly change the DC voltage as if it was not there. Therefore, for purposes of this application, such elements are not substantial storage devices and such embodiments are also considered as "not having a substantial energy storage device" and as such are further embodiments of the invention.

Indirect Drive Circuit

Figure 13:
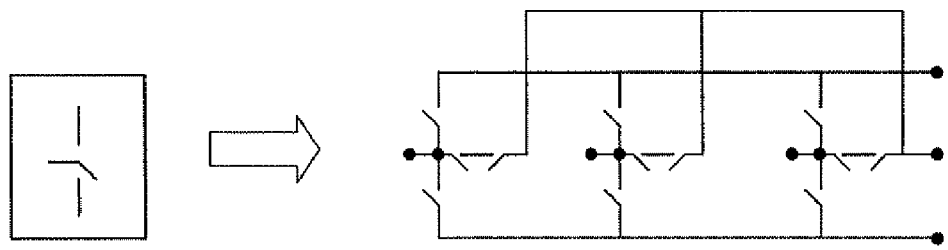
FIG. 13 illustrates an exemplary embodiment of an inverter used in FIG. 12.
Figure 14:
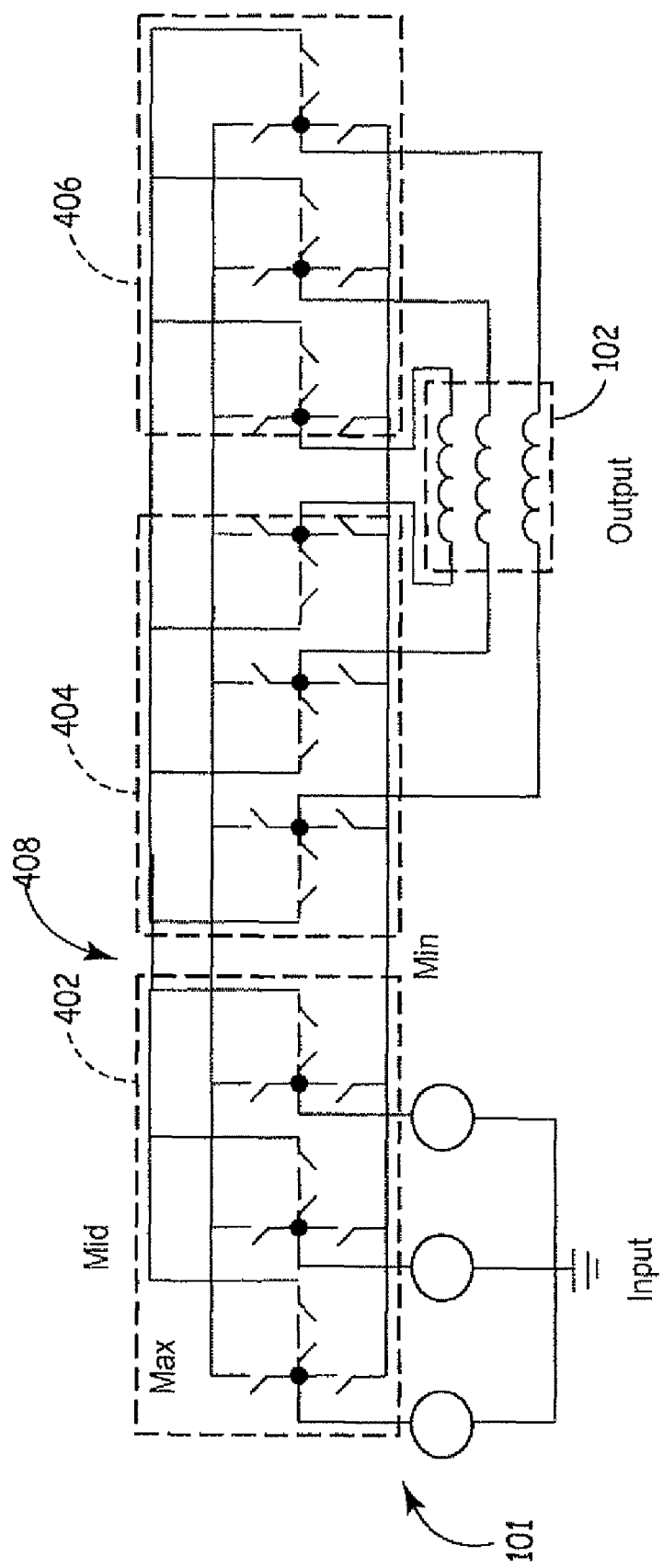
FIG. 14 illustrates the second exemplary embodiment of FIG. 12 with each of the switches shown.

FIG. 13 illustrates the switch configuration of each of the inverters 402, 404 and 4-6, while FIG. 14 illustrates the complete switch configuration. Referring to FIG. 14, the set of voltages 101 are connected to three-level inverter 402. The three output terminals of the inverter 402 are noted as Max, Min and Mid. In the exemplary embodiment, the Max and Min terminals are connected to voltages 101 through unidirectional switches and the Mid terminal is connected to voltages 101 through bidirectional switches. Operation as a motor is as follows: at any instant the unidirectional switches connected to the voltage phases 101 having maximum and minimum instantaneous voltage are switched on. And the bidirectional switch, which is shown in FIG. 14 by a combination of two unidirectional switches, connected to the voltage phase 101 with medium instantaneous voltage is switched on.

Thus a three-level repeating, fluctuating or pulsating DC-link 408 is available for inverters 404 and 406, which in turn excite the open-ended load (e.g. motor) from three-level DC-link 108. The generation of output voltage from inverters 404 and 406 is similar to that described above where use of CCW and CW vectors provides up to 1.5 p.u. increase in output voltage across the windings of AC machine 102 and power factor control.

For purposes of illustration, the voltage on line 408A is a repeating, fluctuating or pulsating positive voltage with respect to the neutral of the source, the voltage on line 408B is a repeating, fluctuating or pulsating negative voltage with respect to the neutral of the source, and the voltage on line 408C can vary positive to negative with a value ranging from the positive voltage on line 408A to the negative voltage on line 408B. This operation applies to all three level DC links herein described.

Figure 14A:
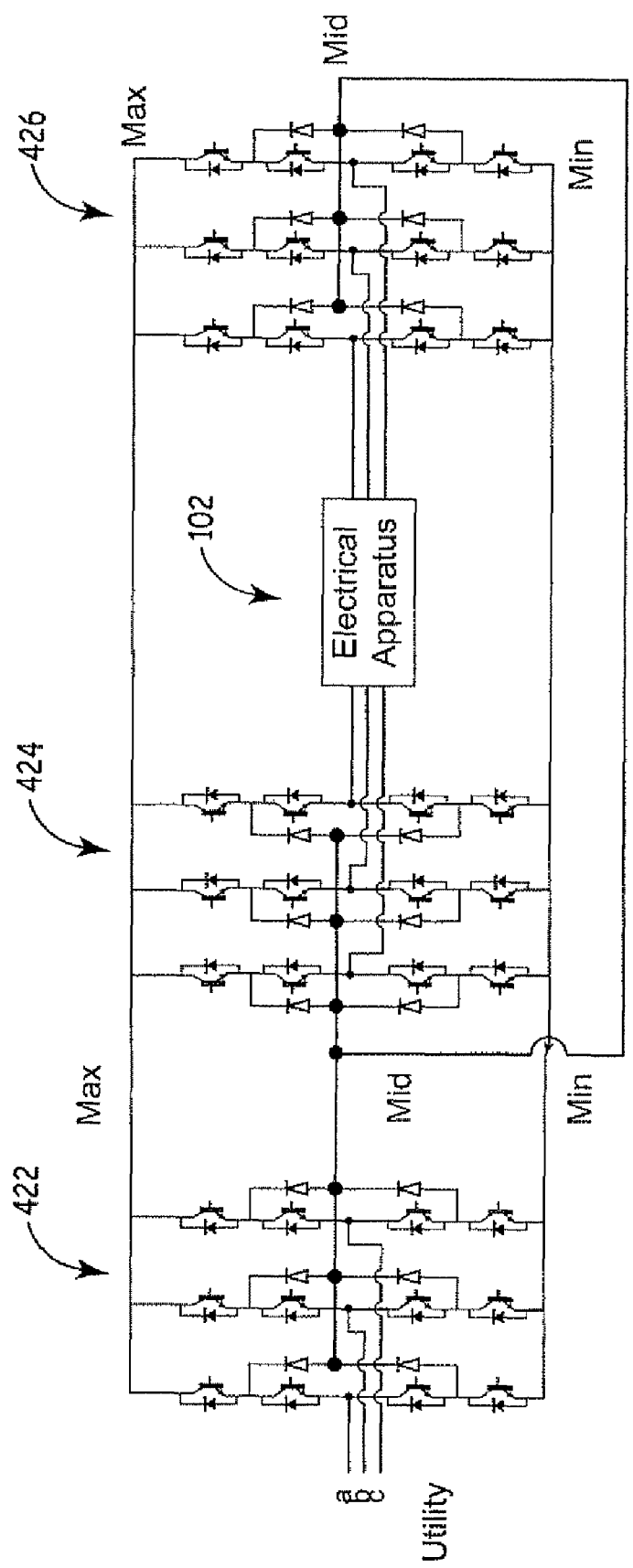
FIG. 14A illustrates another topology for three, three level inverters, each comprising a neutral point clamped inverter.

FIG. 14A illustrates another topology for three, three level inverters 422, 424 and 426, each comprising a neutral point clamped inverter. It is noted that the capacitors typically found in such circuits can be discarded. As appreciated by those skilled in the art, other forms of three-level converters can be used. Control of the embodiment of FIG. 14A is similar to that described above with respect to the embodiment of FIG. 14. Furthermore, it should be noted, the topology of FIGS. 14 and 14A allows common mode elimination.

Figure 15:
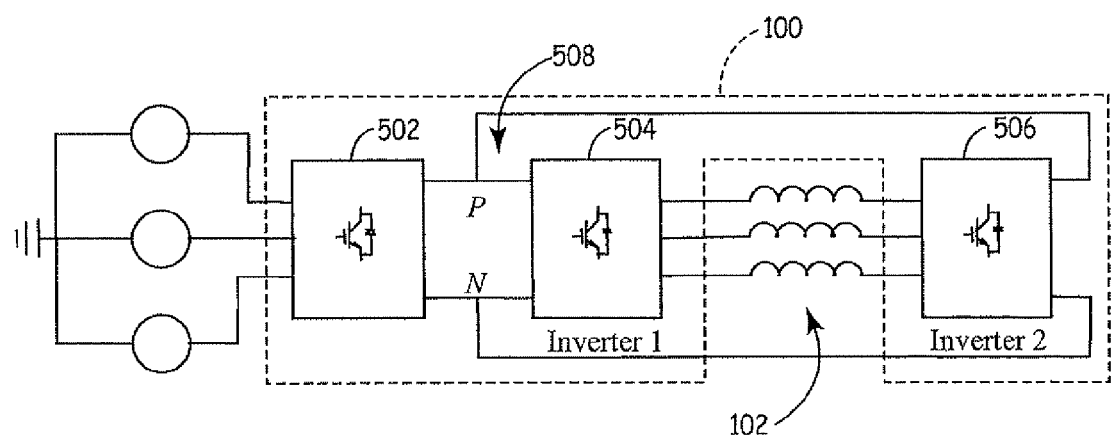
FIG. 15 illustrates a third exemplary embodiment of the switching assembly which includes three, two-level converters.

FIG. 15 illustrates another exemplary embodiment for the drive circuit or switching assembly 100, specifically comprising three switch-mode converters 502, 504 and 506, each a two-level and consisting of 6 unidirectional switches. Operating as a motor drive circuit, converter 502 functions as a inverter providing a repeating, fluctuating or pulsating DC link 508, while converters 504 and 506 are connected at opposite ends of the AC machine 102.

In this embodiment, the inverter 502 is not dynamically controlled. Rather, by connecting the input phase with the most positive voltage to line P of DC link 508, and the phase with the most negative voltage to line N of DC link 508 (as illustrated in FIG. 16A), the output of inverter 502 or DC link 508 is a time-varying dc voltage of the waveform shown in FIG. 16B, and the currents (neglecting the switching components due to inverters) in each of the input phases are nearly rectangular as in a diode rectifier bridge with a constant dc-side current as illustrated in FIG. 16C.

By so doing in the inverter 502, a path for currents is continuously provided to the input supply. In order to facilitate easy current commutation in the inverter 502, it is possible to coordinate it with the inverters 504, 506 to make the dc-link current zero. Since there are no high frequency transitions in the dc-link 508 because the inverter 502 is not switched at a high frequency, switching of common-mode voltages does not occur, thus avoiding bearing currents. In addition to this, the switching losses in the inverter 502 are minimized. The control of the inverters 504 and 506 in FIG. 15 is explained with the next embodiment to be described. It should be understood that the power flow through this system can be in either direction. Another benefit of this topology is that it uses only 18 unidirectional switches, compared to 36 uni-directional switches in the two matrix converter embodiment above. However, a disadvantage of this topology may be that the input current at the utility side contains harmonics with a THD of possibly around 30%, although the displacement power factor is nearly unity.

Figure 15A:
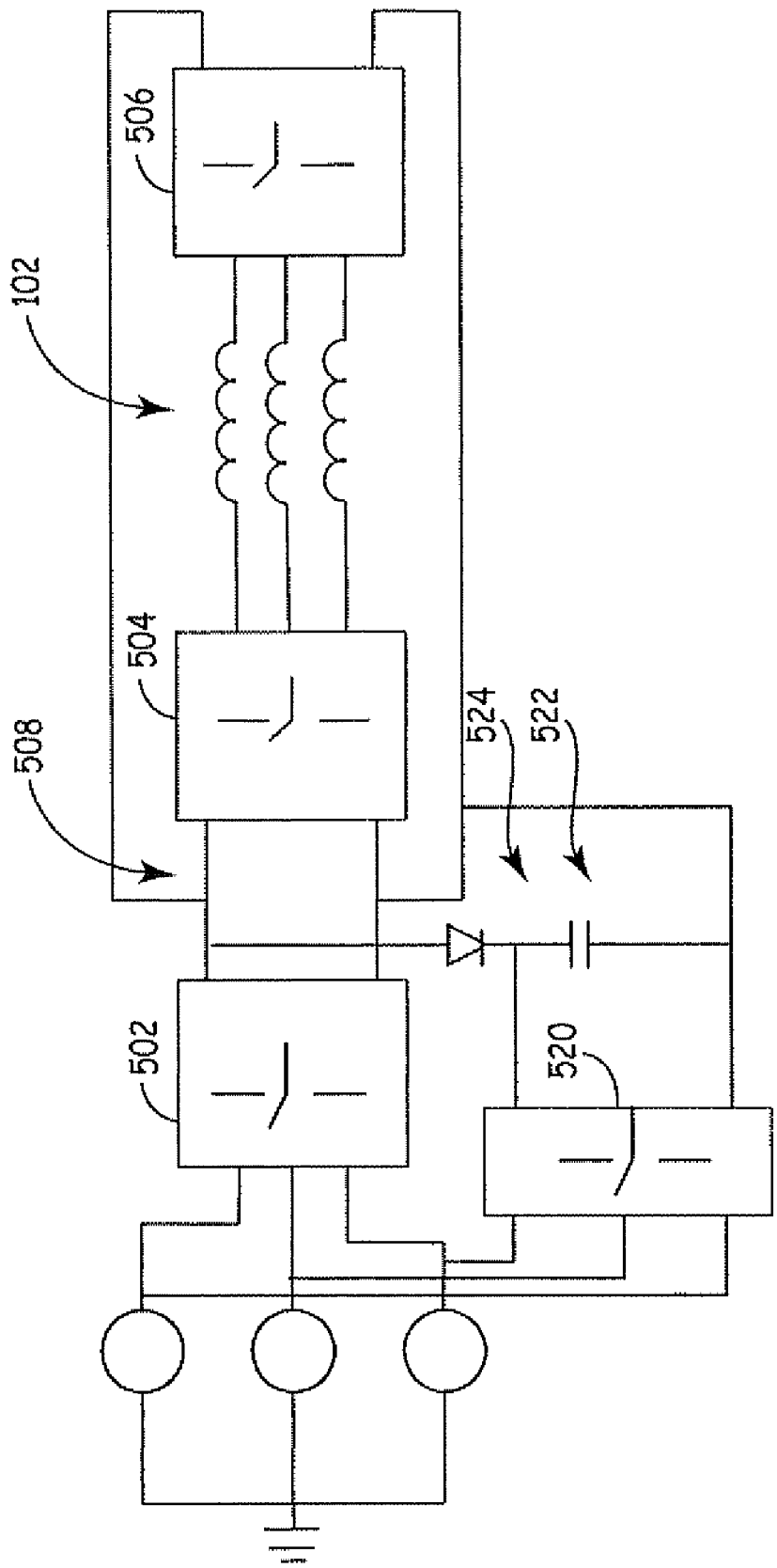
FIG. 15A illustrates use of an active filter.

Some may consider the substantially rectangular current on the utility side of the embodiment of FIG. 15 to be disadvantageous. In the embodiment of FIG. 15A, an active filter 520 (schematically shown since such filters are generally well known) is provided. In the embodiment illustrated, the active filter 520 is coupled to the DC link 508 between inverter 502 and inverter 504 using a capacitor 522 of a clamp capacitor circuit 524. Clamp circuit 524 (also known as snubber capacitors) are commonly used in converter circuits such as those described and illustrated herein. In the embodiment illustrated, the capacitor 522 serves two functions that being functioning in the clamp circuit 524 as well as supporting active filter 520. Typically, the active filter 520 is configured so as to ensure that the utility draws or supplies sinusoidal currents.

Figure 17:
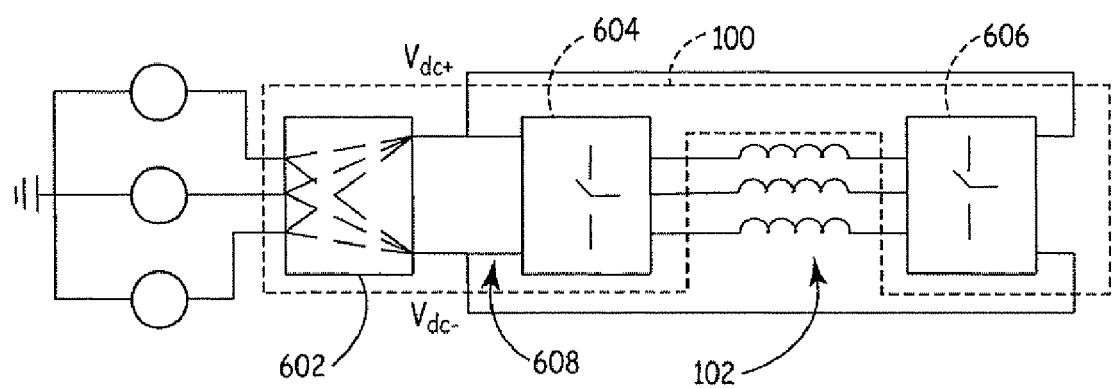
FIG. 17 illustrates a fourth exemplary embodiment of the switching assembly which includes a converter and two, two level inverters.

In comparison to the embodiment of FIG. 15, the embodiment illustrated in FIG. 17, drive circuit 100 includes a DC matrix converter 602 and two inverters 604 and 606. However, DC matrix converter 602 in one exemplary embodiment can include 6 bi-directional switches in order to provide sinusoidal currents at a controllable power factor. Another example would be to use a Sparse Matrix Converter.

In FIG. 17, the DC matrix converter 602 produces a dc link 608 that is provided (when operating as a motor) to the opposite ends of the motor/generator 102 by two 2-level inverters 604, 606, each having 6 unidirectional switches. In this topology, the common-mode voltage transitions, although significantly reduced, are not eliminated.

It should be noted conversion of three-phase to dc can be accomplished by the DC matrix converter 602 being a matrix converter having 6 bi-directional switches, which allows control over the line-side power factor and allows bi-directional power flow. However, as appreciated by those skilled in the art, matrix converter 602 can also be embodied as a Sparse Matrix Converter that uses 9 unidirectional switches. Furthermore, this approach of using a matrix converter or a sparse-matrix converter can also be applied where only two phases of the AC machine 102 carry currents at a given time.

If the power factor control is not the objective and the power flow is only in one direction, then a unity power factor operation with power flow in uni-direction can be achieved if the DC matrix converter 602 in FIG. 16 is a well-known Vienna Rectifier with a capacitor clamp circuit, as described in the patent "Dual Bridge Matrix Converter" U.S. Pat. No. 6,995,992 B2, which is incorporated herein in its entirety.

Control of this embodiment is accomplished by integrating the control philosophy of the rectifier portion of the indirect matrix converter as described by Larsen, K. B.; Jorgensen, A. H.; Helle, L.; Blaabjerg, F.; in "Analysis of symmetrical pulse width modulation strategies for matrix converters" PSEC.2002 Volume 2, 23-27 Jun. 2002 Page(s):899-904, vol. 2 and the control philosophy of conventional open-ended induction motor drive for common-mode voltage elimination as described by Baiju, M. R.; Mohapatra, K. K.; Kanchan, R. S.; Gopakumar, K.; "A dual two-level inverter scheme with common mode voltage elimination for an induction motor drive" Power Electronics, IEEE Transactions. Volume 19, Issue 3, May 2004 Page(s): 794-805, both of which are hereby incorporated by reference in their entirety.

As described by Baiju et al. the common-mode voltage generated from the open-ended induction motor with a DC-link voltage equal to Vdc (the top rail voltage is equal to Vdc/2 and the bottom rail voltage is equal to −Vdc/2) can have two possible values for the common mode voltage at each terminal of the machine. For one set of switching combinations the common mode voltage is equal to Vdc/3 and for the rest of the switching combinations the common mode voltage is equal to −Vdc/3.

Figure 18A:
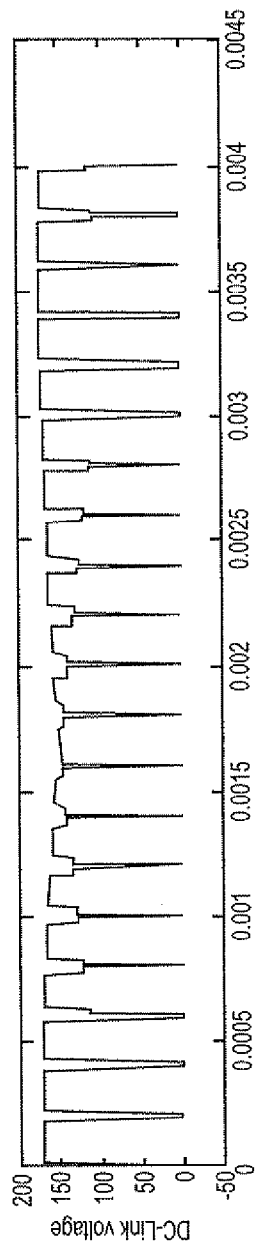
FIG. 18A illustrates a DC-link voltage.
Figure 18B:
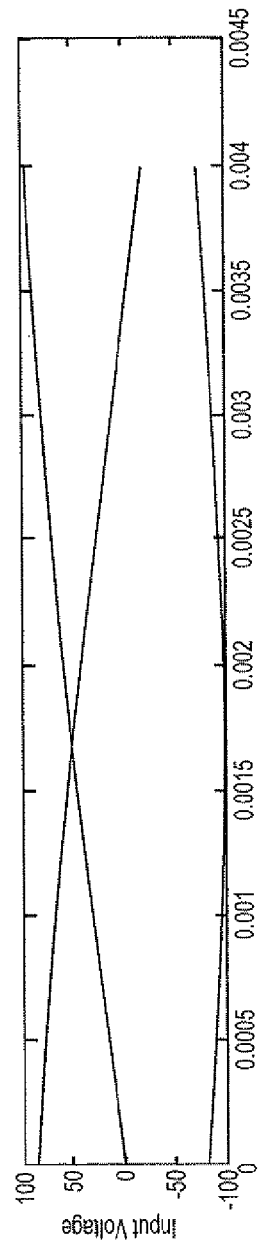
FIG. 18B illustrates input voltages to a converter.
Figure 18C:
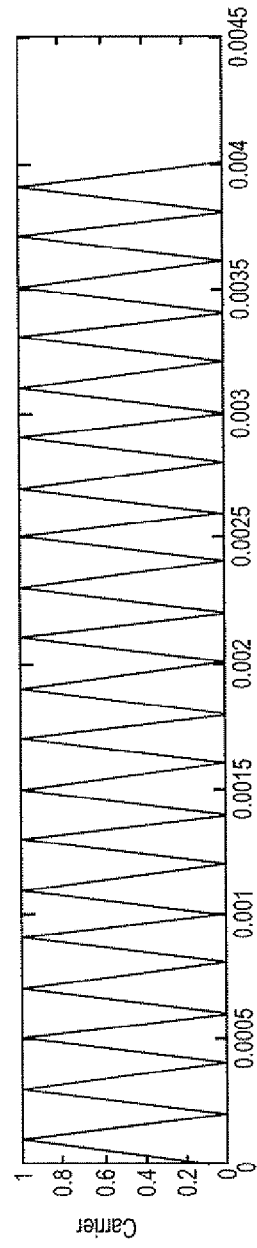
FIG. 18C illustrates a carrier signal.

In the embodiment of FIG. 17, the DC-link voltage 608 available from the DC matrix converter 602 fluctuates between two line voltage levels because of power factor control in the input side. FIG. 18a illustrates DC-link voltage relative to input voltages to DC matrix converter 602 illustrated by FIG. 18b and a carrier signal illustrated by FIG. 18c. At any instant, at three possible DC-link voltages can be obtained at the DC-link 608 which are equal to (Vmax-Vmid), (Vmax-Vmin) and (Vmid-Vmin) in value. Depending on the input section, the chosen DC-link values are either (Vmax-vmin) and (Vmid-Vmin) or (Vmax-Vmin) and (Vmax-Vmid). Thus the possible common mode voltages are either (Vmax-Vmid)/3, (Vmax-vmin)/3 and (Vmid-Vmin)/3 in value, or −(Vmax-Vmid)/3, −(Vmax-Vmin)/3 and −(Vmid-Vmin)/3, in value which can be obtained by utilizing the modulation method proposed by Baiju et al. The common mode voltages are typically chosen in such a way that the minimum possible common mode fluctuation is possible.

Modulation Strategy for Reduced Common Mode Voltages

Figure 19:
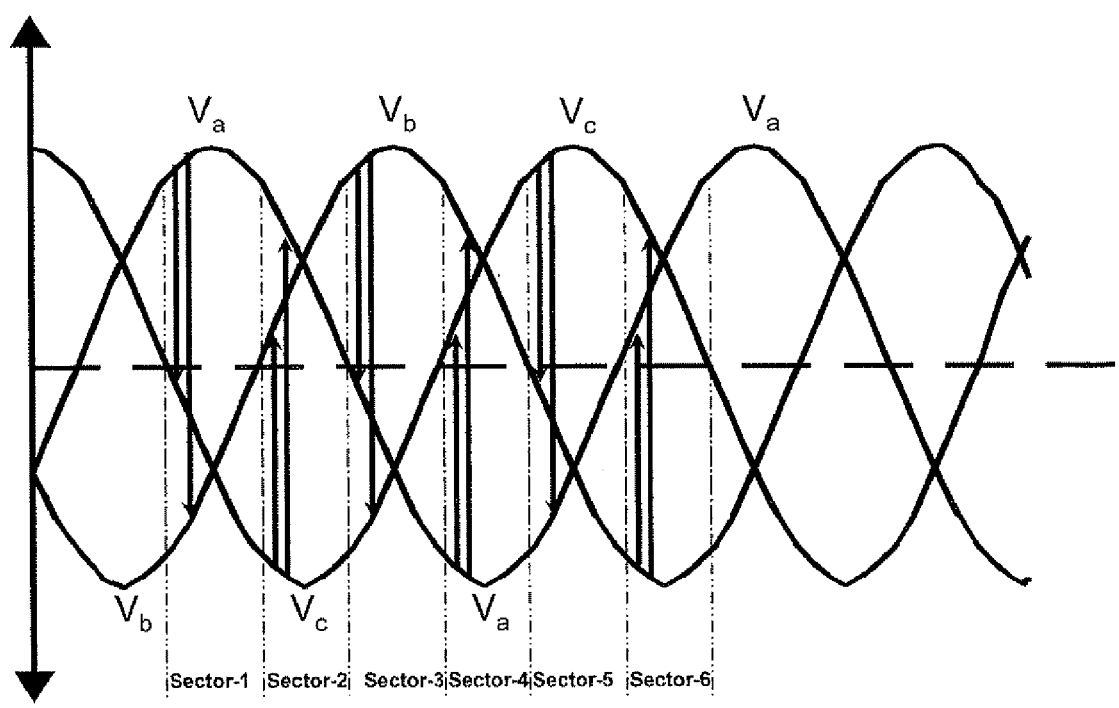
FIG. 19 illustrates three phase input voltages divided into six sectors depending on the relative amplitude of the phase voltages.

The input voltage to the DC matrix converter 602 of FIG. 17 is shown in FIG. 19. The three phase input voltages are divided into six sectors depending on the relative amplitude of the phase voltages. At any instant summation of the three phase voltages is zero i.e. $V_a+V_b+V_c=0$.

The DC matrix converter 602 of FIG. 17 generates a time-varying DC-link voltage 608 for the inverters 604 and 606. At any instant the DC-link voltage 608 can have two possible values equal to the input line voltages. The possible DC-link values are given in Table-1 and FIG. 18 and they are chosen based on whichever input phase has the maximum absolute value at any instant. In sector-1, where the phase-a has the maximum absolute value among the three phase voltages, the required DC-link voltages are the input side line voltages $V_{ab}$ and $V_{ac}$. In sector-2, phase-c has the maximum absolute value, therefore the chosen line voltages for the DC-link are $V_{ac}$ and $V_{bc}$.

TABLE 1

| SECTOR | DC-link voltages |
|---|---|
| 1 | $V_{ab}, V_{ac}$ |
| 2 | $V_{ac}, V_{bc}$ |
| 3 | $V_{bc}, V_{ba}$ |
| 4 | $V_{ba}, V_{ca}$ |
| 5 | $V_{ca}, V_{cb}$ |
| 6 | $V_{cb}, V_{ab}$ |

Every switching cycle, the entire period is time-shared between two available line voltages for the effective output voltage generation across load and for input side power factor control. Though only the maximum line voltage can be used for the DC-link voltage generation, in order to make the input side power factor and harmonics controllable, two line voltages are time-shared for the DC-link 608. Provided the DC-link 608 has continuous and constant current flow, the time interval for which the line voltages are shared for the DC-link voltage are given in Table-2. For simplicity the whole switching period is taken to be unity. Let $\hat{V}$ be the amplitude of the input voltage. Then the time period for which the line voltage is effectively proportional to the minimum of the absolute value of the phase voltages, which comprise the line voltage. For example when the input voltage is in sector-1, line voltages $V_{ab}$ and $V_{ac}$ are the possible DC-link voltages. The line voltage $V_{ab}$ comprises of the phase voltage $V_a$ and $V_b$ and among them $V_b$ has the minimum absolute value. Therefore for sector-1, the duration, for which line voltage $V_{ab}$ is the DC-link voltage, is proportional to the absolute value of $V_b$. Similarly, the time period, for which the line voltage $V_{ac}$ is the DC-link voltage in sector-1, is proportional to the absolute value of the phase voltage $V_c$.

TABLE 2

| SECTOR | DC-link voltages | Effective duration |
|---|---|---|
| 1 | $V_{ab}$ | $|V_b|/\hat{V}$ |
|   | $V_{ac}$ | $|V_c|/\hat{V}$ |
| 2 | $V_{ac}$ | $|V_a|/\hat{V}$ |
|   | $V_{bc}$ | $|V_b|/\hat{V}$ |
| 3 | $V_{bc}$ | $|V_c|/\hat{V}$ |
|   | $V_{ba}$ | $|V_a|/\hat{V}$ |
| 4 | $V_{ba}$ | $|V_b|/\hat{V}$ |
|   | $V_{ca}$ | $|V_c|/\hat{V}$ |
| 5 | $V_{ca}$ | $|V_a|/\hat{V}$ |
|   | $V_{cb}$ | $|V_b|/\hat{V}$ |
| 6 | $V_{cb}$ | $|V_c|/\hat{V}$ |
|   | $V_{ab}$ | $|V_a|/\hat{V}$ |

The balance time duration, called redundant period, is ineffective in power factor control. Therefore in the redundant period, either the DC-link current should be made zero or the DC-link voltage should be made zero.

Inverter Control

Figure 20A:
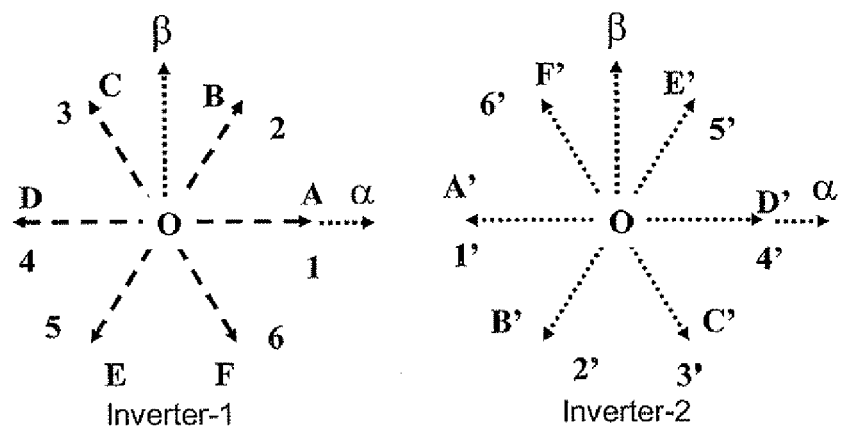
FIG. 20A illustrates a set of space vectors from individual inverters.

The open-ended machine 102 is fed from the DC-link through two two-level inverters from opposite ends (FIGS. 15 and 17). The space vectors generated from individual inverters are shown in (FIG. 20a). The space vectors 1, 3 and 5 of inverter-1, and 1', 3' and 5' of inverter-2 have same common mode voltage, which is equal to $(V_P+V_N+V_N)/3$ where $V_P$ is the potential at point P which is the positive rail of the dc-link, whereas $V_N$ is the potential at point N which is the negative rail of the dc-link. The space vectors 2, 4 and 6 of inverter-1, and 2', 4' and 6' of inverter-2 have same common mode voltage, which is equal to $(V_P+V_P+V_N)/3$. By combining the space vectors of both inverters, which have same common-mode voltage, two sets of hexagonally disposed space vectors are obtained in FIG. 20b and FIG. 20c. The space vectors in FIG. 20b have a common mode voltage equal to $(V_P+V_N+V_N)/3$ and the space vectors in FIG. 20c have a common mode voltage equal to $(V_P+V_P+V_N)/3$.

With different input-side line voltages as the DC-link voltage, the output voltage vector is generated from either of the two hexagons (FIG. 20b and FIG. 20c) in order to achieve minimum common mode voltage and minimum common mode voltage transition. There are a total of six active vectors and three zero vectors in either of FIG. 20b and FIG. 20c. Every switching period the output vector is generated by time weighted sum of active vectors and zero vectors as accomplished in normal two level inverters. Varying the modulation index controls the amplitude of the output. When the active vectors, which have non-zero amplitude, are used in a switching period, called the effective period, the load current is reflected in the DC-link.

Figure 21:
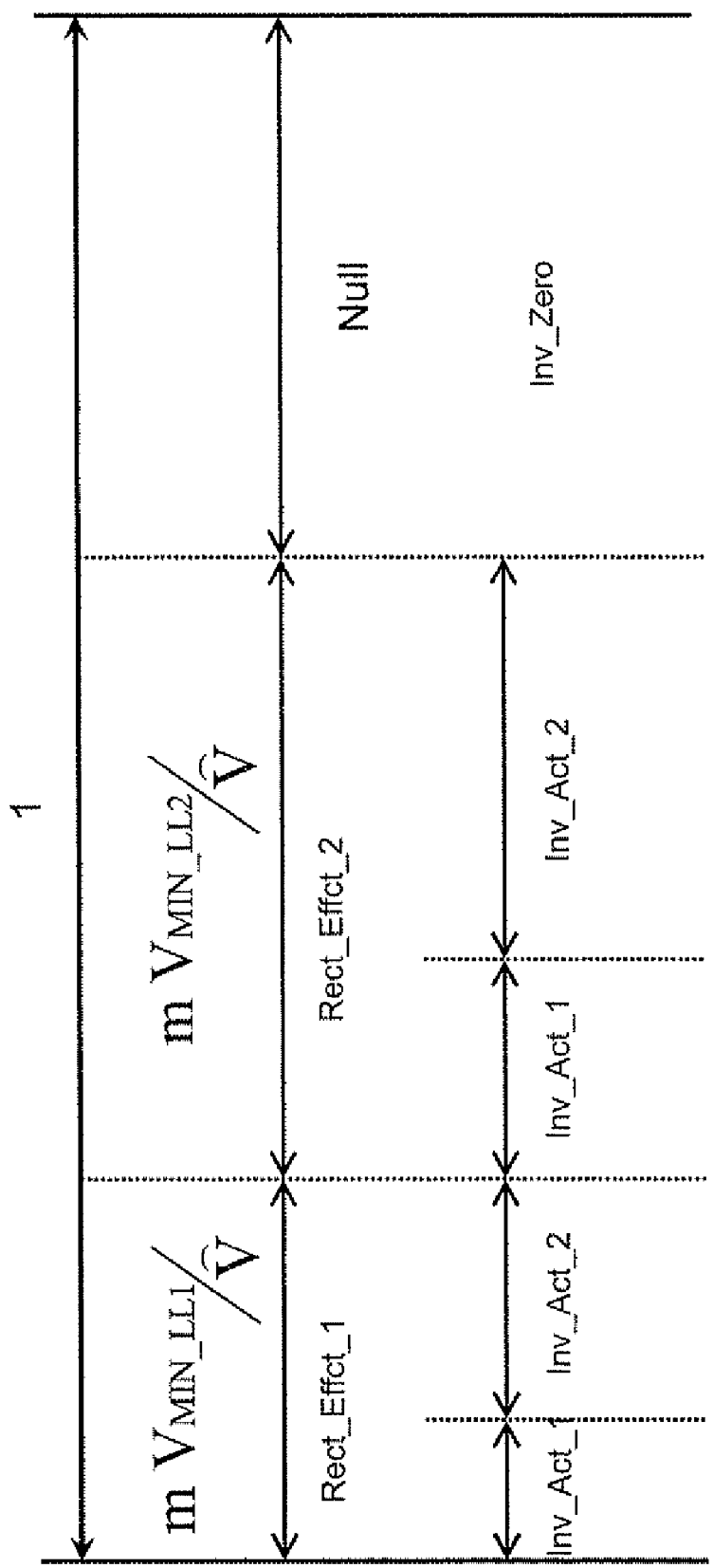
FIG. 21 illustrates an entire switching period.

As described in the DC matrix converter 602 control section above and shown in Table-2, the DC matrix converter 602 is effective for a period which is equal to the ratio of the absolute value of the minimum phase voltage comprising the line voltage and the amplitude of the phase voltage. This is the effective period for DC matrix converter 602. Out of this effective rectifier period, only a fraction proportional to the output modulation index (m, 0<m<1) is effective on the inverter output generation. In FIG. 21 the entire switching period, which is equal to unity, is subdivided into different subintervals.

The whole period as illustrated in FIG. 21 is primarily subdivided into three sections called Rect_Effct_1, Rect_Effct_2 and Null. The two line voltages in any sector as shown in Table-1 are replaced by two generalized line voltages $V_{LL1}$ and $V_{LL2}$ for convenience. During the period Rect_Effct_1, which is equal to $mV_{MIN\_LL1}/\hat{V}$, $V_{LL1}$ is the effective DC-link voltage and during Rect_Effct_2, which is equal to $mV_{MIN\_LL2}/\hat{V}$, $V_{LL2}$ is the effective DC-link voltage. $V_{MIN\_LL1}$ and $V_{MIN\_LL2}$ are the absolute value of the minimum phase voltages comprising the line voltage $V_{LL1}$ and $V_{LL2}$ respectively. $\hat{V}$ is the amplitude of the phase voltage and m is the output modulation index.

Figures 20B, 20C:
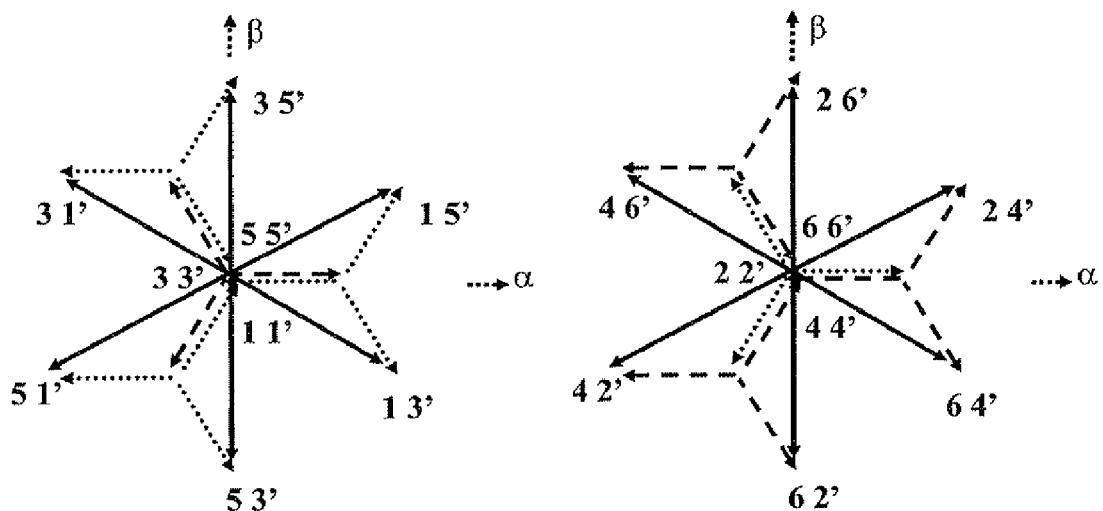
FIG. 20B illustrates a first combination of the set of space vectors of FIG. 20A.
FIG. 20C illustrates a second combination of the set of space vectors of FIG. 20A.

The dual inverters connected to the open-ended machine generate two sets of hexagonally disposed space vectors along with zero vectors as shown in FIG. 20b and FIG. 20c. The amplitude of the space vectors in FIG. 20b and FIG. 20c are proportional to the instantaneous value of the DC-link voltage. As in any conventional two-level inverter, two consecutive active space vectors from either of FIG. 20b and FIG. 20c are chosen for inverter output vector generation depending on whichever sector the output vector is located in. Thus the effective period Rect_Effct_1 and Rect_Effct_2 are further subdivided into two parts Inv_Act_1 and Inv_Act_2 for time-sharing two consecutive active space vectors. The rest of the time period is called the Null period when zero vectors from either of FIG. 20b and FIG. 20c are used for output voltage magnitude control. During this Null period or Inv_zero period, the DC-link current is zero. Therefore irrespective of the line voltage chosen as the DC-link voltage during this Null period, the input side current and power factor remain unaffected. Thus either $V_{LL1}$ or $V_{LL2}$ can be chosen as the DC-link voltage during the Null period as deemed convenience. Any switching sequence chosen in FIG. 21 can also be altered without affecting the output and input. Preferably the switching sequence should be chosen in order to achieve minimum number of switching transitions.

Common-Mode Voltage Control

The common mode voltage in the output is directly dependent on the instantaneous line voltage chosen as the DC-link voltage and the inverter space vector, which either belongs to the set of FIG. 20b or to the set of FIG. 20c. Any DC-link value has two possible common mode voltages, which are equal to $(V_P+V_N+V_N)/3$ and $(V_P+V_P+V_N)/3$ and there are in total two possible DC-link values in every switching period. Therefore in every switching period, there are four possible combinations of common mode voltages. Out of them only those common mode voltages, which give minimum transition, should be chosen for output generation.

For example when the input voltages are in sector-1, (FIG. 19 and Table-1) the allowable DC-link voltages are $V_{ab}$ and $V_{ac}$. When the DC-link voltage is equal to $V_{ab}$, the upper rail of the DC-link is connected to input phase-a and the lower rail of the DC-link is connected to the input phase-b. Therefore $V_{dc+}=V_a$ and $V_{dc-}=V_b$.

For output generation from FIG. 20b, the common mode voltage $V_{com}=(V_a+V_b+V_b)/3=(V_b-V_c)/3$. And for output generation from FIG. 20c, the common mode voltage $V_{com}=(V_a+V_a+V_b)/3=(V_a-V_c)/3$. When the DC-link voltage is equal to $V_{ac}$, for space vector of FIG. 20b, the common mode voltage $V_{com}=(V_c-V_b)/3$. And for space vector of FIG. 20c, the common mode voltage $V_{com}=(V_a-V_b)/3$. Thus when there is transition in the DC-link voltage from $V_{ab}$ to $V_{ac}$, the possible common mode transitions are $$(V_b-V_c)/3-(V_c-V_b)/3=2V_{bc}/3. \quad (3)$$

$$(V_b-V_c)/3-(V_a-V_b)/3=V_b. \quad (4)$$

$$(V_a-V_c)/3-(V_c-V_b)/3=-V_c. \quad (5)$$

$$(V_a-V_c)/3-(V_a-V_b)/3=V_{bc}/3. \quad (6)$$

Among the values given in Eq. 3 to Eq. 6, the value given in Eq. 3 should be ignored, because it is never minimum. Among the rest of the three values, the minimum one is considered at any instant. For example in early part of sector-1 the value in Eq. 5 is minimum, during the middle part of sector-1 value in Eq. 6 is minimum, and during the later part of sector-1, the value in Eq. 4 is minimum. Therefore three different sets of space vector switching sequences are chosen in every sector. To reduce switching and complexity in algorithm, any one set of space vector switching sequence can be used at a cost of higher common-mode transition. Similar modulation technique is followed for other sectors.

Figure 22:
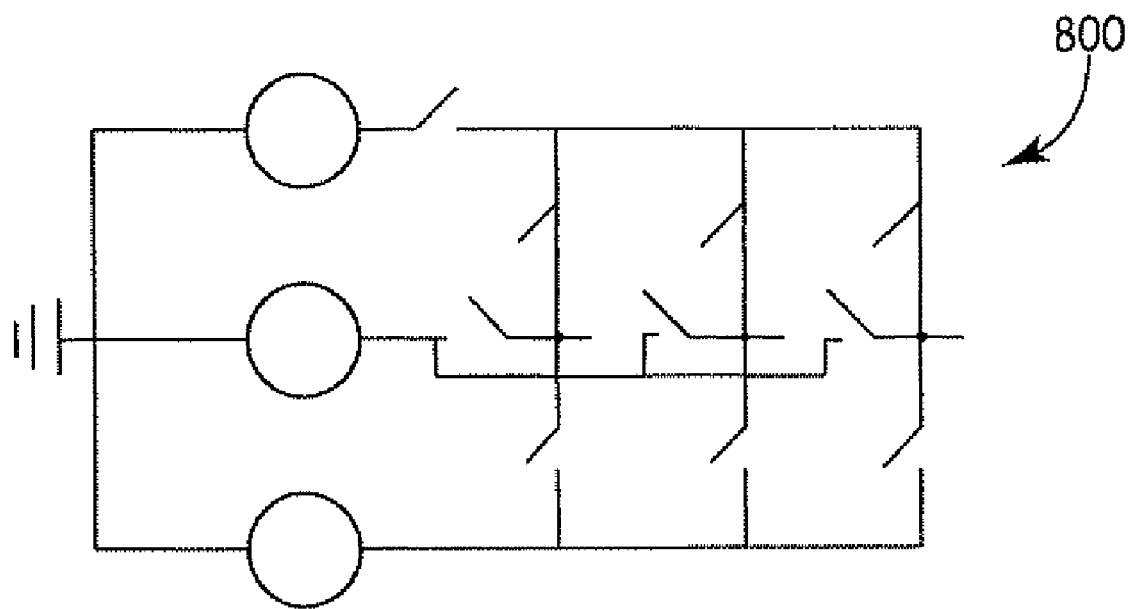
FIG. 22 illustrates a switch assembly for connecting multi-phase machine windings in a wye-connection.

It should also be noted to reduce switching losses at low output voltages to the AC machine 102 in the embodiments described above, it is possible to connect the multi-phase machine windings in a wye-connection by closing the switches 800 to one of the line-side phases, as illustrated in FIG. 22, and isolating that phase by having an additional switch that is opened. All the switches shown in FIG. 16 are bidirectional switches.

Power Factor Control with a Plurality of Controlled AC Machines

Figure 23:
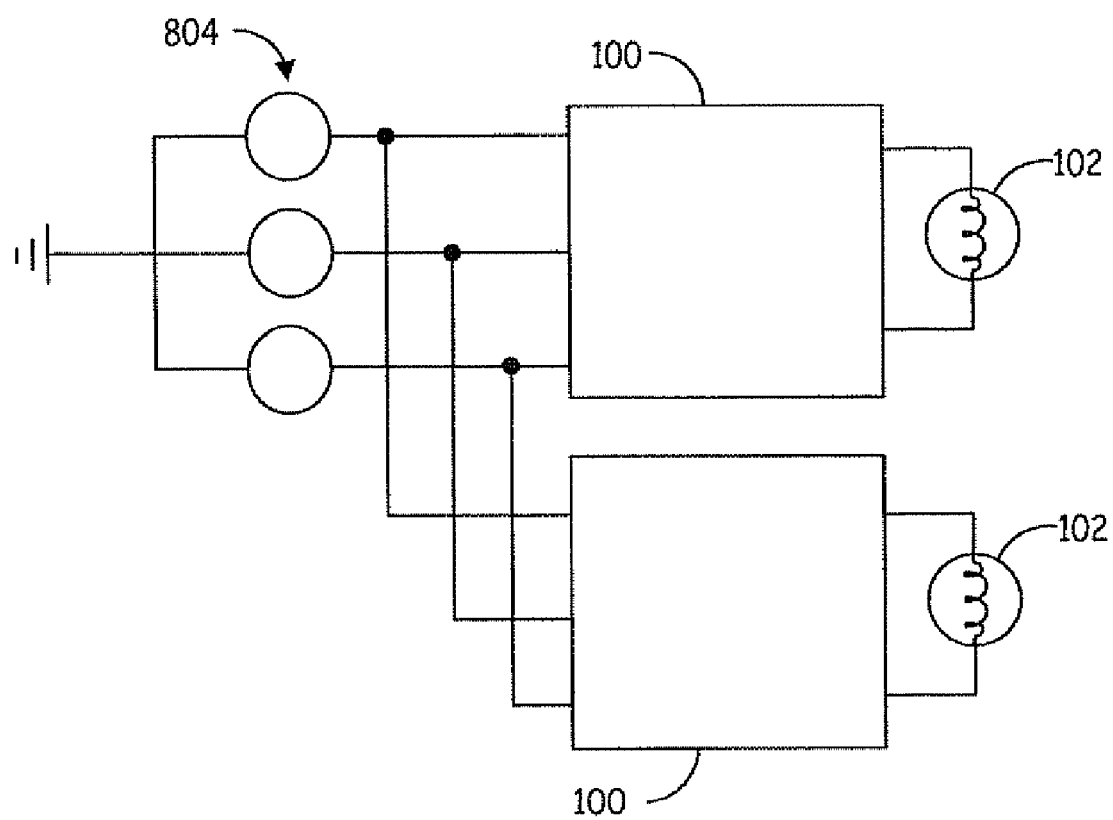
FIG. 23 illustrates a system comprising multiple AC machines and corresponding drive circuits.

FIG. 23 illustrates a system comprising multiple AC machines 102 and corresponding drive circuits 100, which could be any of the embodiments described above and in particular with reference to FIGS. 1, 11, 12 (14), 15 and 17. In such a system, one or more of the AC machines 102 could be operated such as to have a positive or leading power factor, while one or more other AC machines 102 could be operated to have a negative or lagging power factor. In this manner, the combination of operation of all the machines with a selected power factor can be used to realize a desired net power factor at the utility side or power grid 804. One advantage that may be realized would be a reduction of switching losses in the matrix converters if that is how the drive circuit 100 is implemented.

Figure 24:
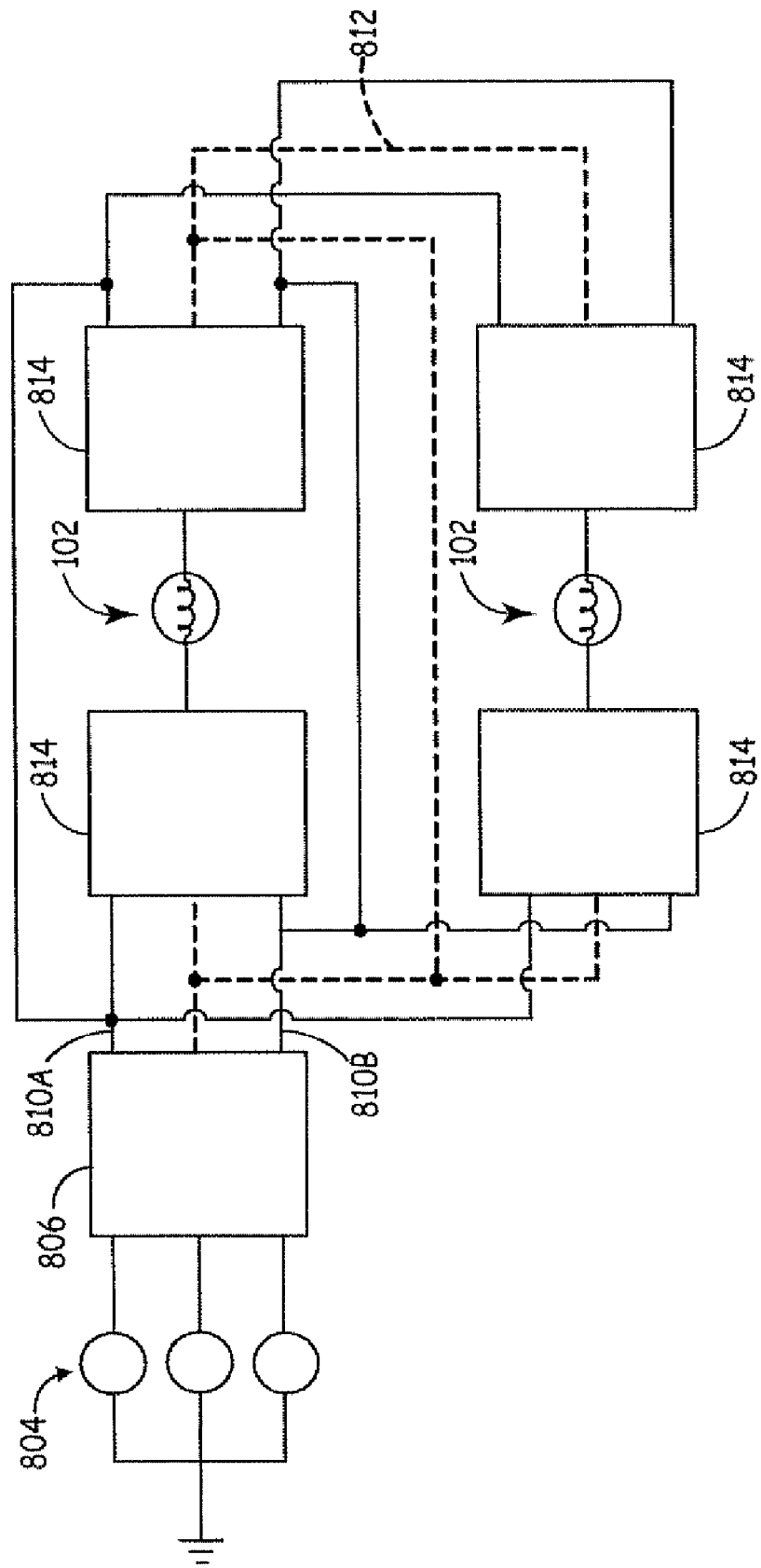
FIG. 24 illustrates multiple AC machines 102 having a common DC link used between portions of two or more drive circuits.

In FIG. 24, multiple AC machines 102 are again illustrated; however in this embodiment a common DC link (two-level or three-level as described above with reference to FIGS. 12, 14, 15 and 17) is used between portions of two or more drive circuits 100. In other words, a single inverter, converter or rectifier 806 is used that provides the DC links to the individual components 814 connected to each end of the open-ended windings. In FIG. 24 a two-level DC link is illustrated in solid lines at 810A and 810B, while a third level 812, if present, is illustrated in dashed lines.

At least two advantages may exist in the embodiment of FIG. 24. First, the number of switching elements is reduced because of the use of the single converter or rectifier 806. Furthermore, in a manner similar to that described above with respect to FIG. 23, each of the AC machines 102 can be operated (leading or lagging power factor) so as to realize a desired power factor at the utility side 804.

Figure 25:
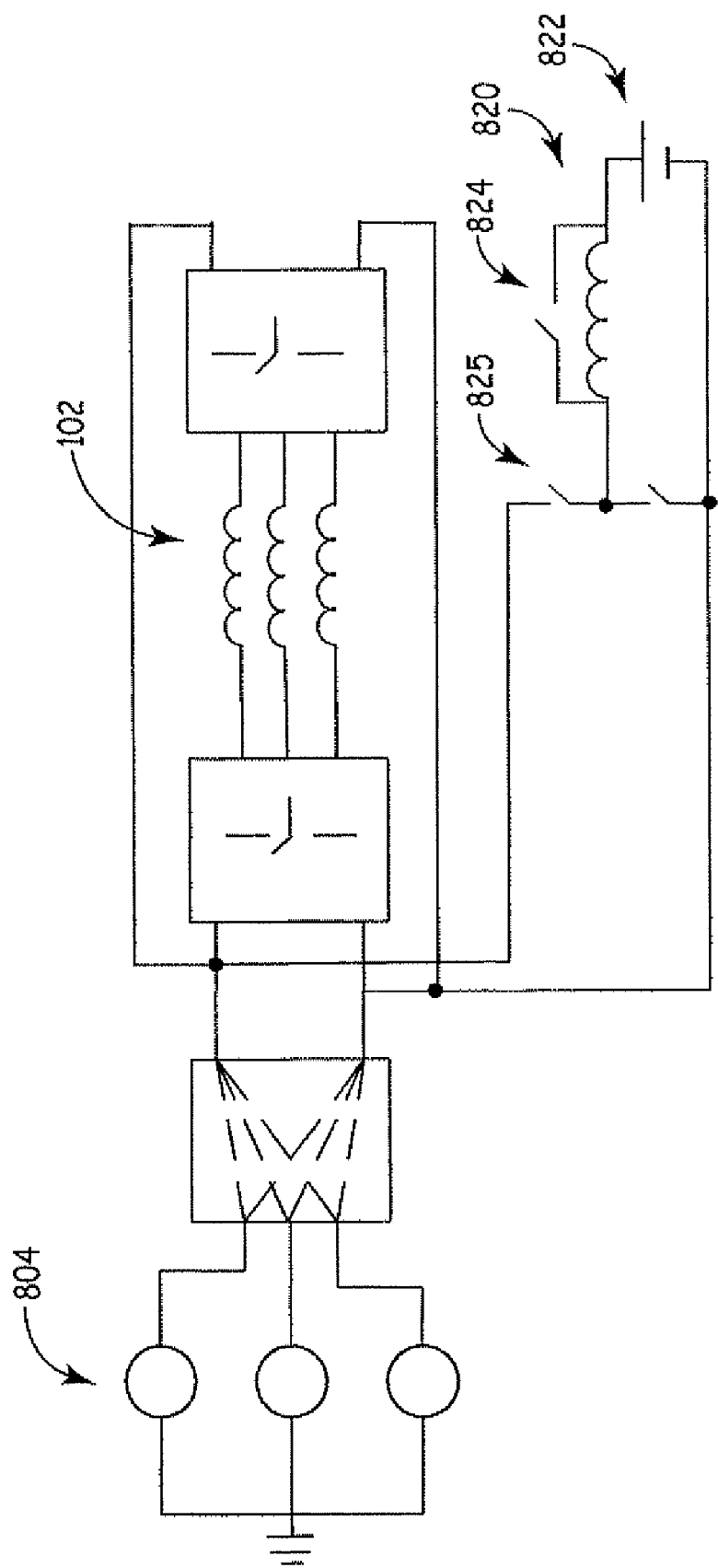
FIG. 25 illustrates a first embodiment having a backup or alternative source.
Figure 26:
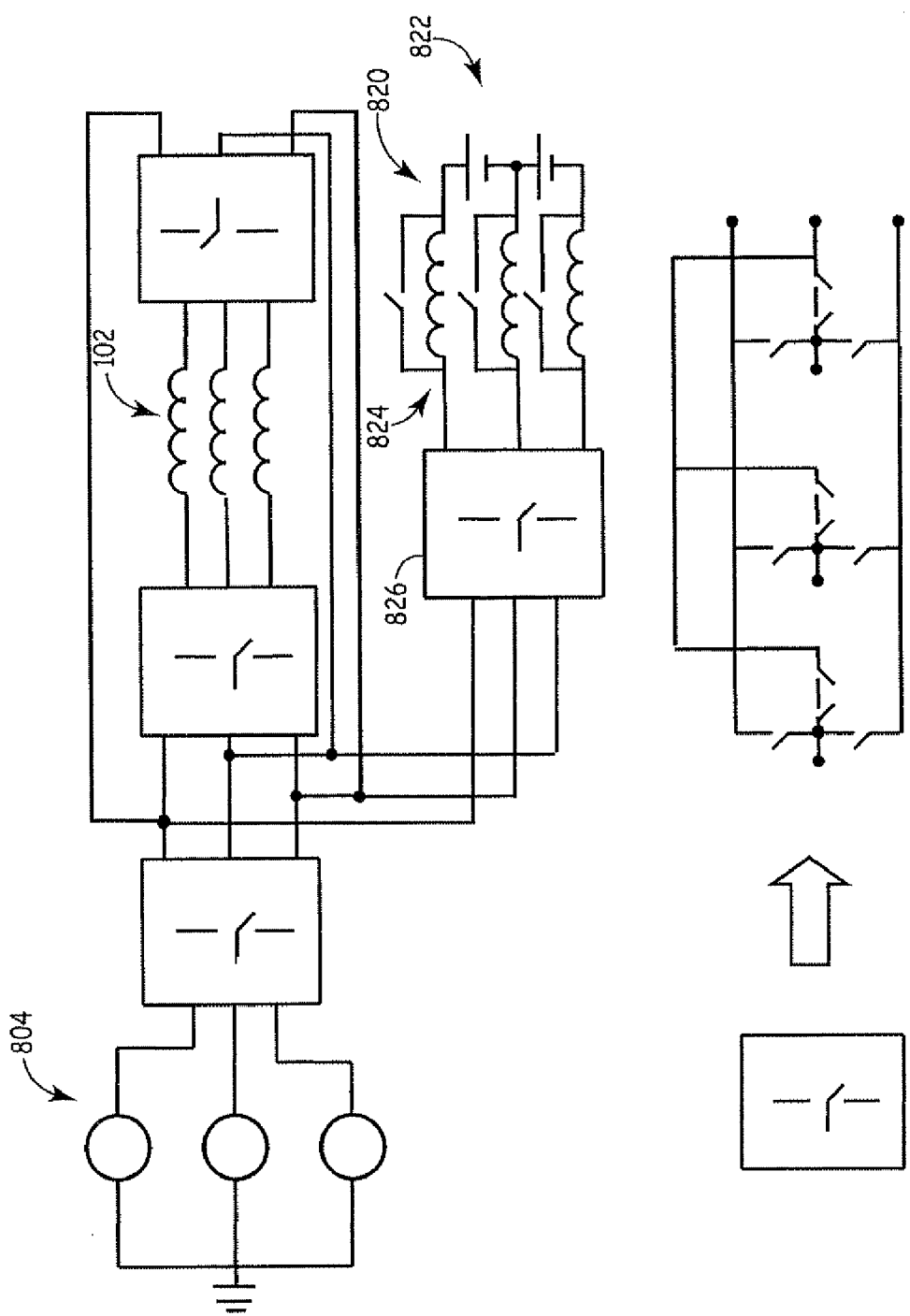
FIG. 26 illustrates a second embodiment having a backup or alternative source.

FIGS. 25 and 26 illustrate use of a backup or alternative source 820, such as battery or batteries 822, that can be used to provide the two or three-level DC link in the event the power from the utility 804 is not satisfactory. It should be understood when powered by the utility 804 battery or batteries 822 are not functioning as intermediate substantial storage devices as discussed in the Background section above, but rather, the battery or batteries are used when the power from the utility is not satisfactory. The battery or batteries can be charged as necessary from the utility. Switches 824 are typically "off" (open) when power is being provided by utility 804, and "on" (closed) when power is needed from the battery or batteries 822. A two-level 825 or three-level inverter 826 is used depending on whether a two-level or three-level link is required.

Although only two AC machines 102 and corresponding drive circuits 100 are illustrated in FIGS. 23 through 26, it should be understood any number of AC machines and drive circuits (or portions thereof) can be present. Furthermore, one or more of the AC machines 102 can actually comprise one or more AC machines connected in series and/or parallel as discussed above with respect to FIG. 1A.

As appreciated by those skilled in the art, the above described logic for all the embodiments can be developed into a control algorithm and implemented in platforms such as but not limited to FPGA, a microcontroller or a DSP.

Transformer Applications

Figure 27:
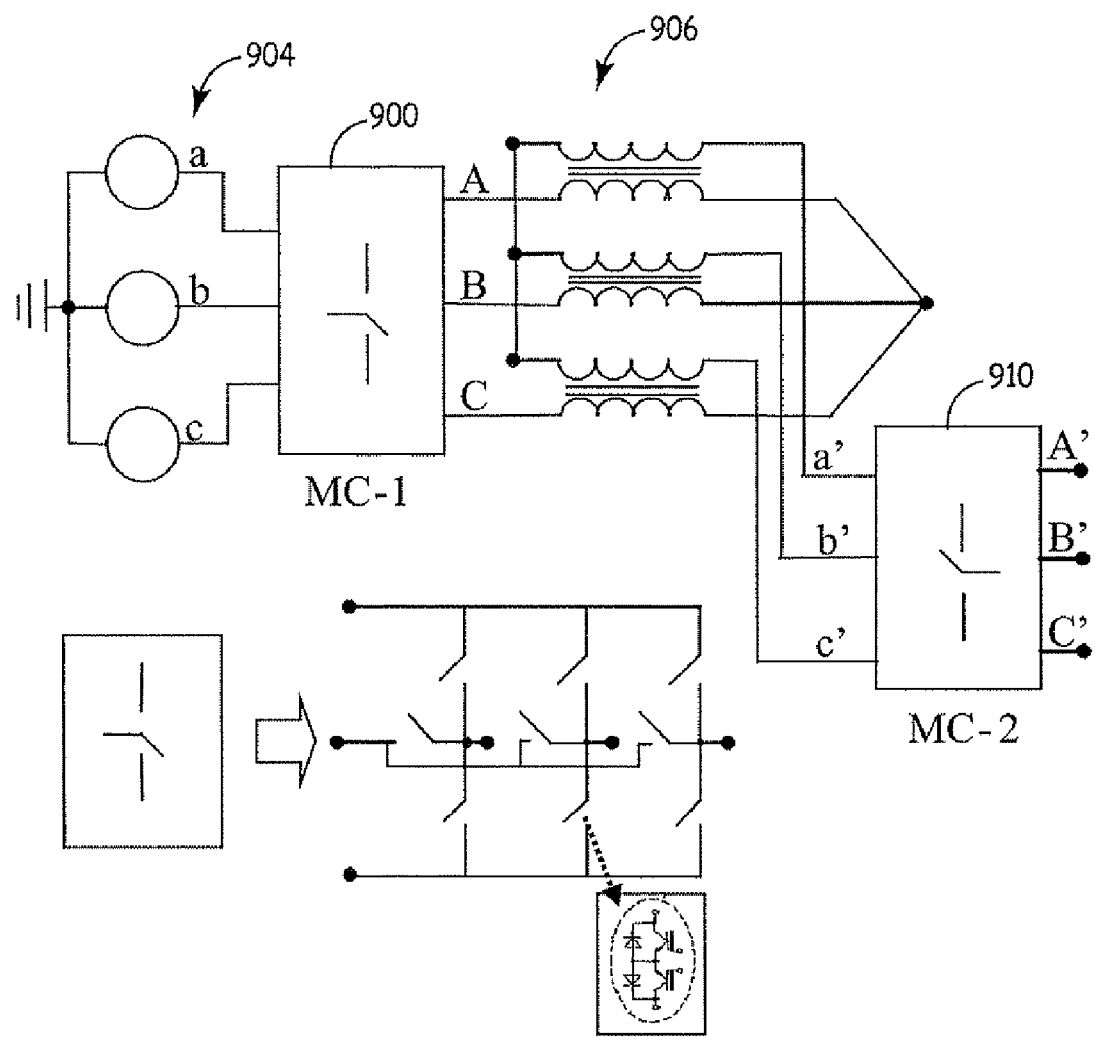
FIG. 27 illustrates known application of matrix converter to a transformer.

Aspects of the present invention can also be applied to transformers, which herein comprise another AC machine due to the presence of multi-phase windings. Before describing aspects of the present invention, it may be helpful to discuss a known application of matrix converter to a transformer, which is illustrated in FIG. 27.

As illustrated, a single matrix converter (MC-1) 900 is used to produce high frequency AC for the primary windings of a transformer 906 from multi-phase voltage source 904.

Figure 28:
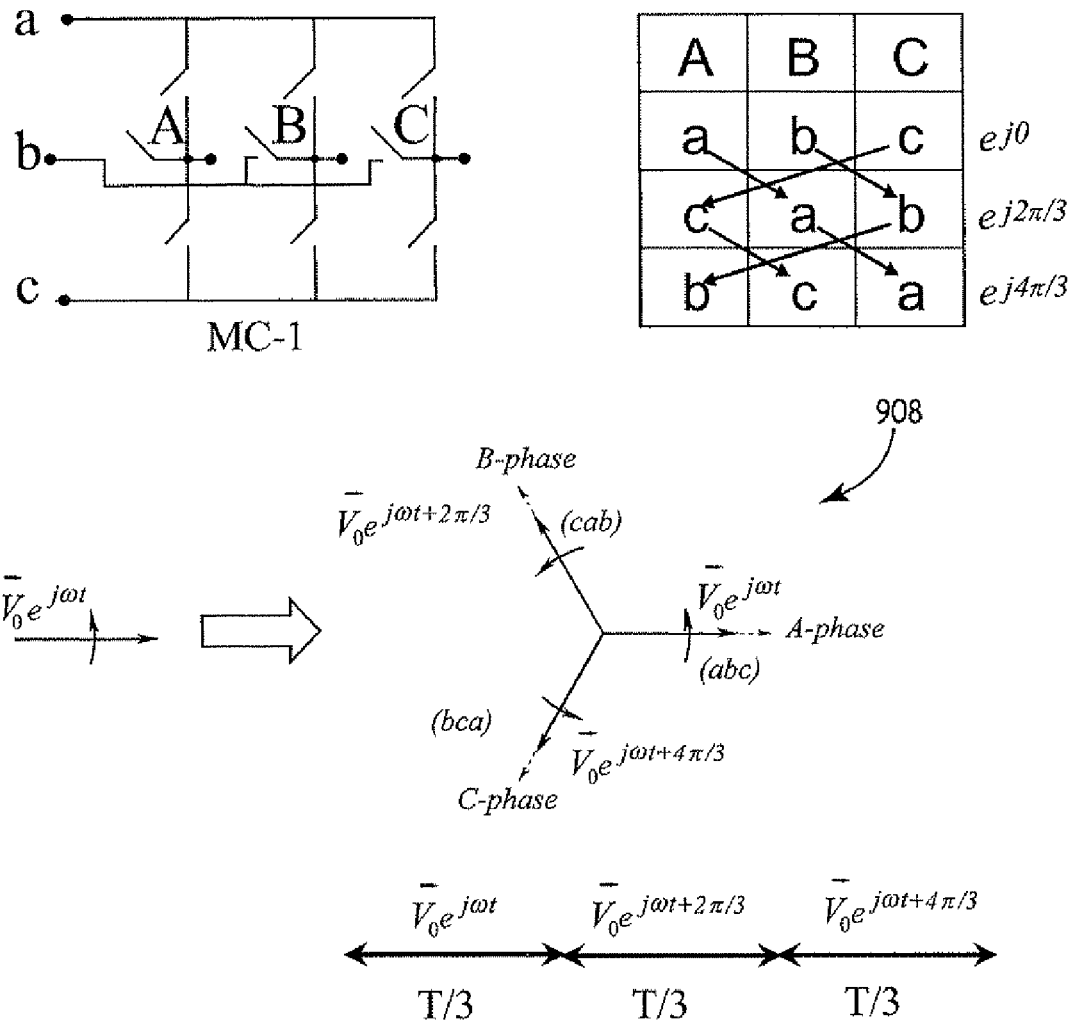
FIG. 28 illustrates control of one of the matrix converters of FIG. 27.

Control of MC-1 900 is illustrated in FIG. 28, where applying three switching combinations generates three space vectors 908, 120 degrees apart in phase for equal intervals in a switching time-period. Therefore, the average voltage input applied to the primary windings of transformer 906 is zero.

Figure 29:
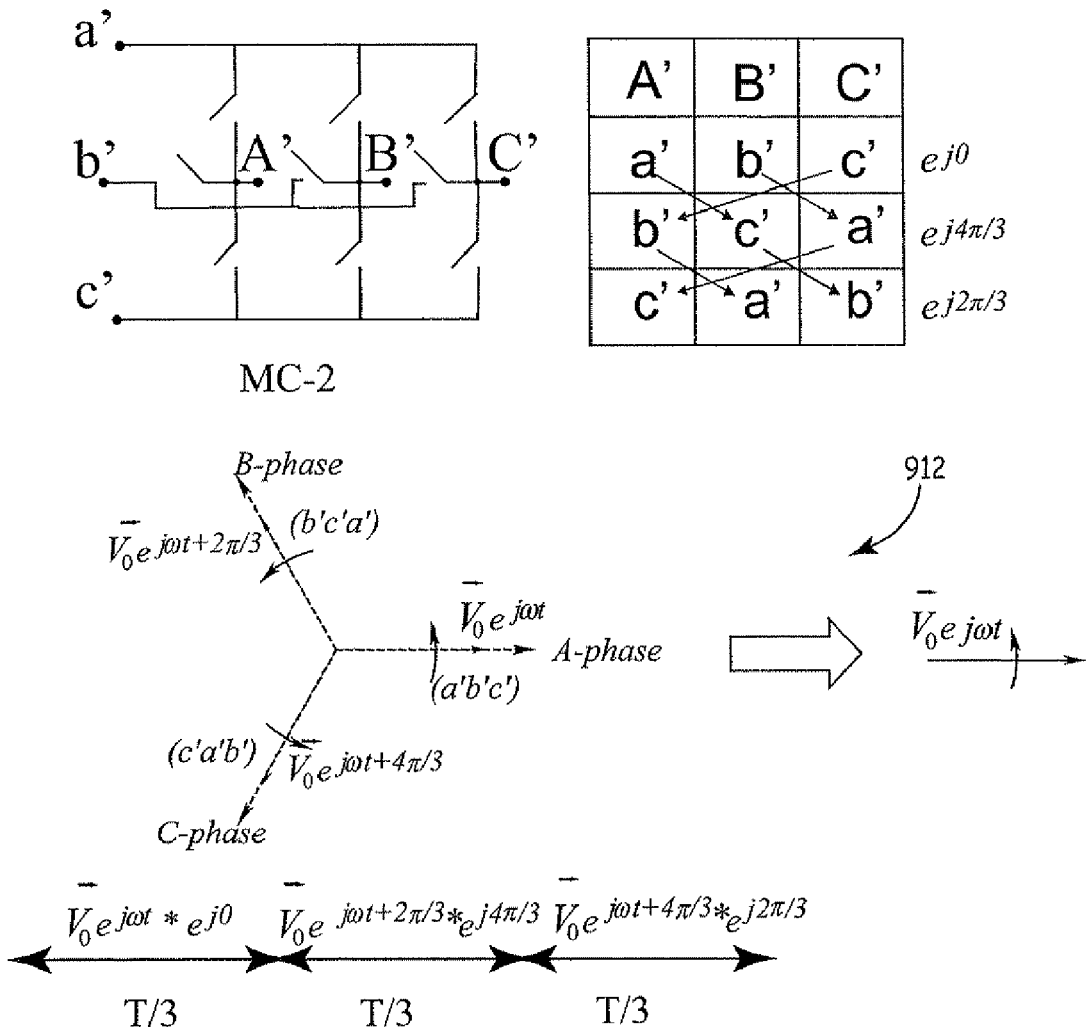
FIG. 29 illustrates control of the other matrix converter of FIG. 27.

A second matrix converter (MC-2) 910 is coupled to the secondary windings of transformer 906 and generates a single space vector from three space vectors 912 that are 120 degrees apart at the transformer output, which is illustrated in FIG. 29.

The foregoing system of FIG. 27 will be considered the base case and the proposed system having aspects of the present invention can be compared to this system.

Figure 30:
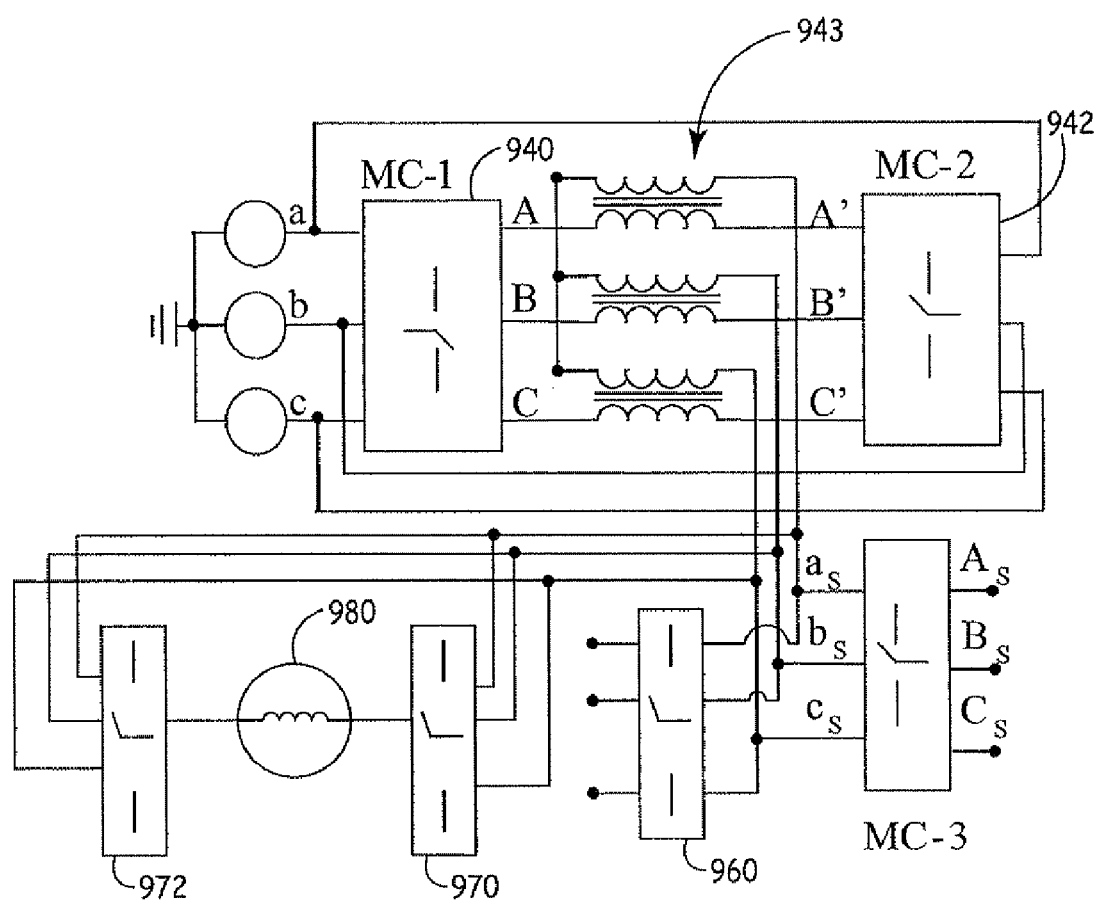
FIG. 30 illustrates another exemplary embodiment having matrix converters.

FIG. 30 illustrates an exemplary embodiment of having aspects of the present invention. In the embodiment illustrated, two matrix converters 940 (MC-1) and 942 (MC-2) are connected to the opposite ends of windings of a plurality of single-phase transformers and/or a multi-phase transformer 943 (herein exemplified as a three-phase transformer.

Using the switching sequence abc, cab and bca anticlockwise (CCW) rotating vectors can be generated from the matrix converters 940 and 942, as shown in FIG. 31.

Figure 32:
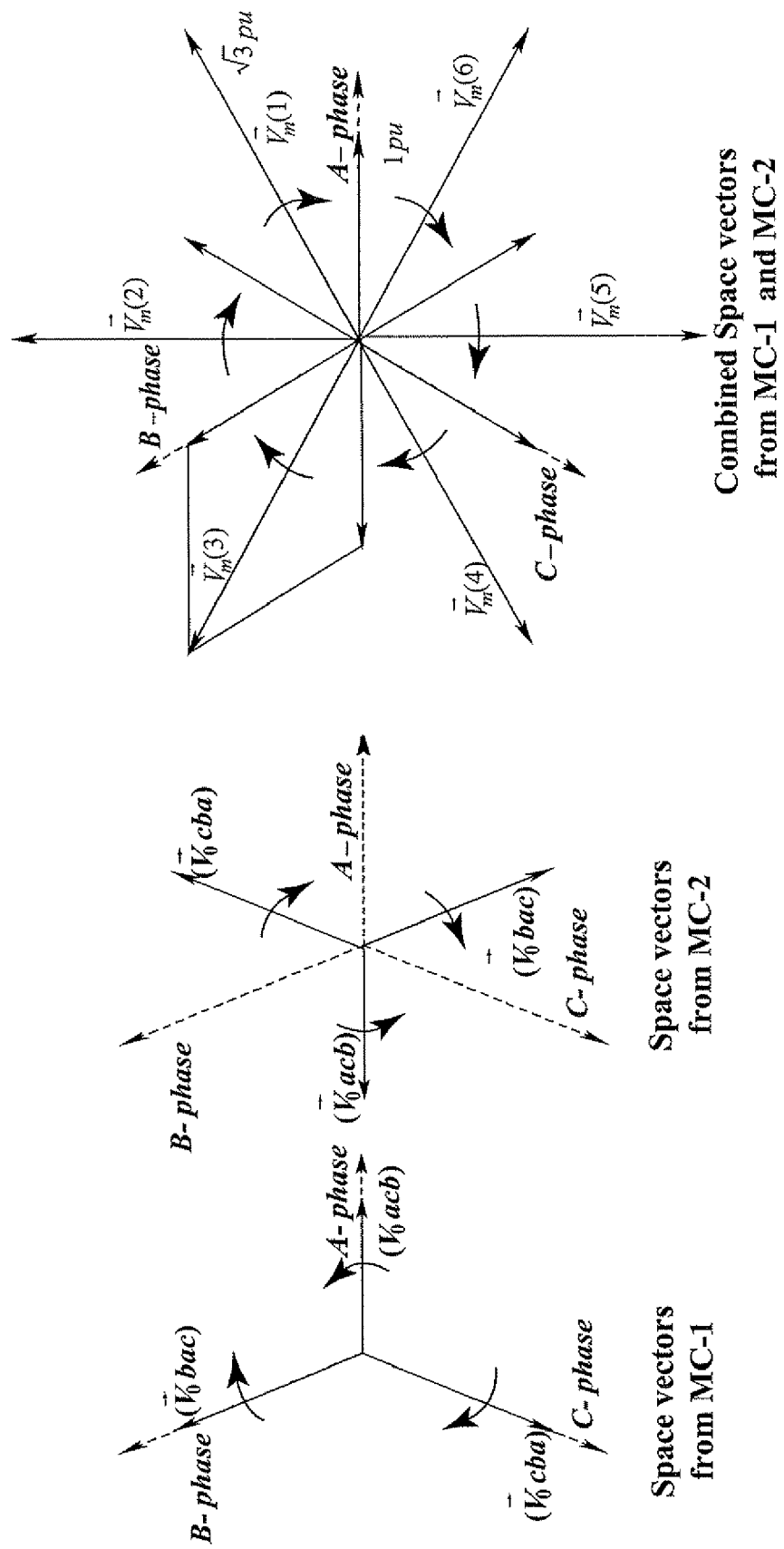
FIG. 32 illustrates a second set of rotating vectors that can be generated from the matrix converters of FIG. 30.

Like the motors and generators discussed above, the amplitude of the basic vectors across the windings, herein the transformer primary winding, is $\sqrt{3}$ pu. Similarly, another switching sequence acb, bac, and cba for matrix converters 940 and 942 can generate clockwise (CW) rotating vectors, as shown in FIG. 32 with the same resultant amplitude of the basic vectors across the windings of $\sqrt{3}$ pu.

Figure 33:
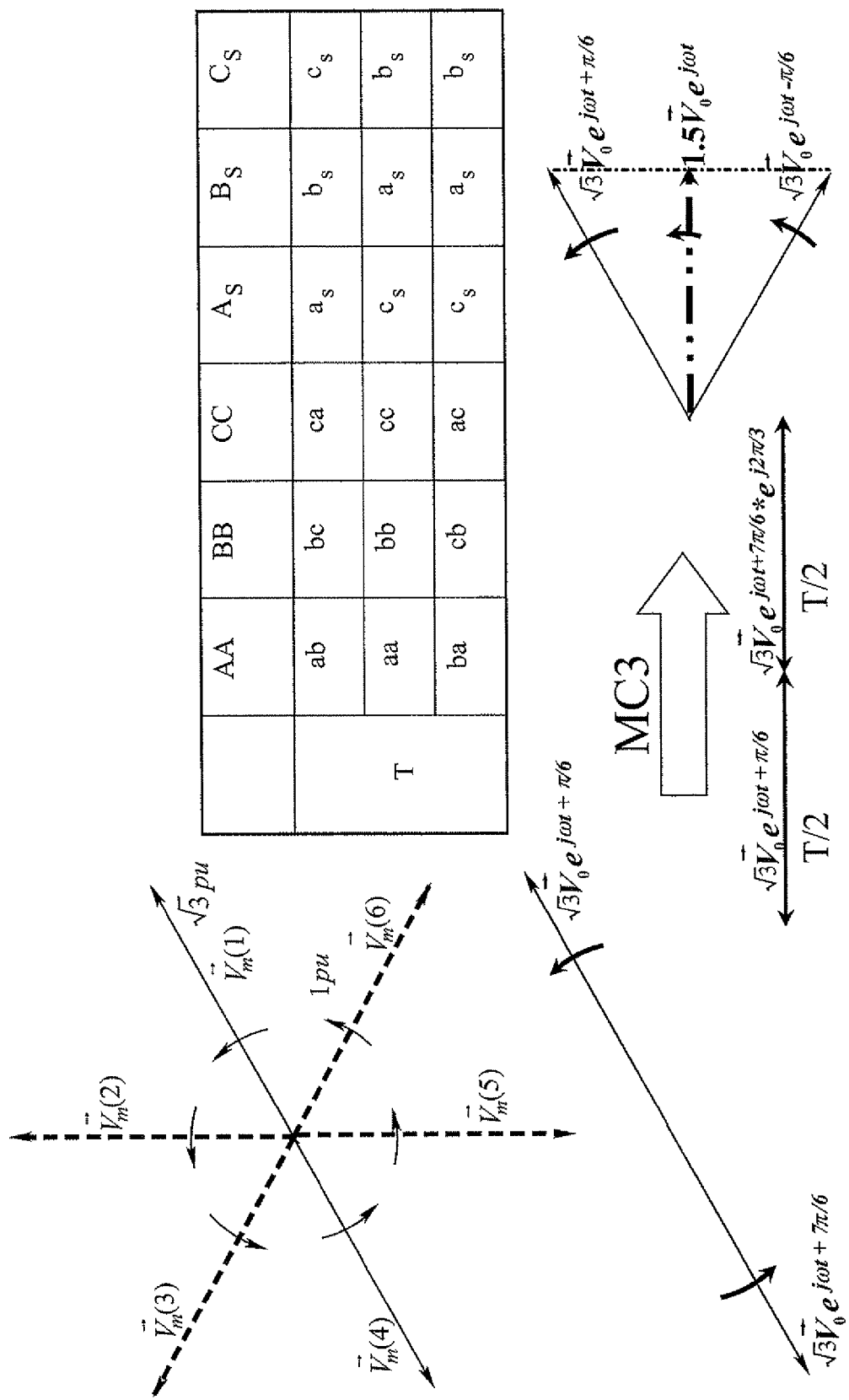
FIG. 33 illustrates how any two opposite vectors and one zero vector for amplitude control can be used for voltage synthesis.

In a further embodiment, an addition converter 950, such as a matrix converter (MC-3), can be connected to the secondary windings of transformer 943 as illustrated in FIG. 30. Converter 950 is used to generate synthesized voltages. FIG. 33 illustrates how any two opposite vectors and one zero vector for amplitude control can be used for voltage synthesis through converter 950. Without any zero vector, the maximum possible amplitude is 1.5 pu.

Figure 34:
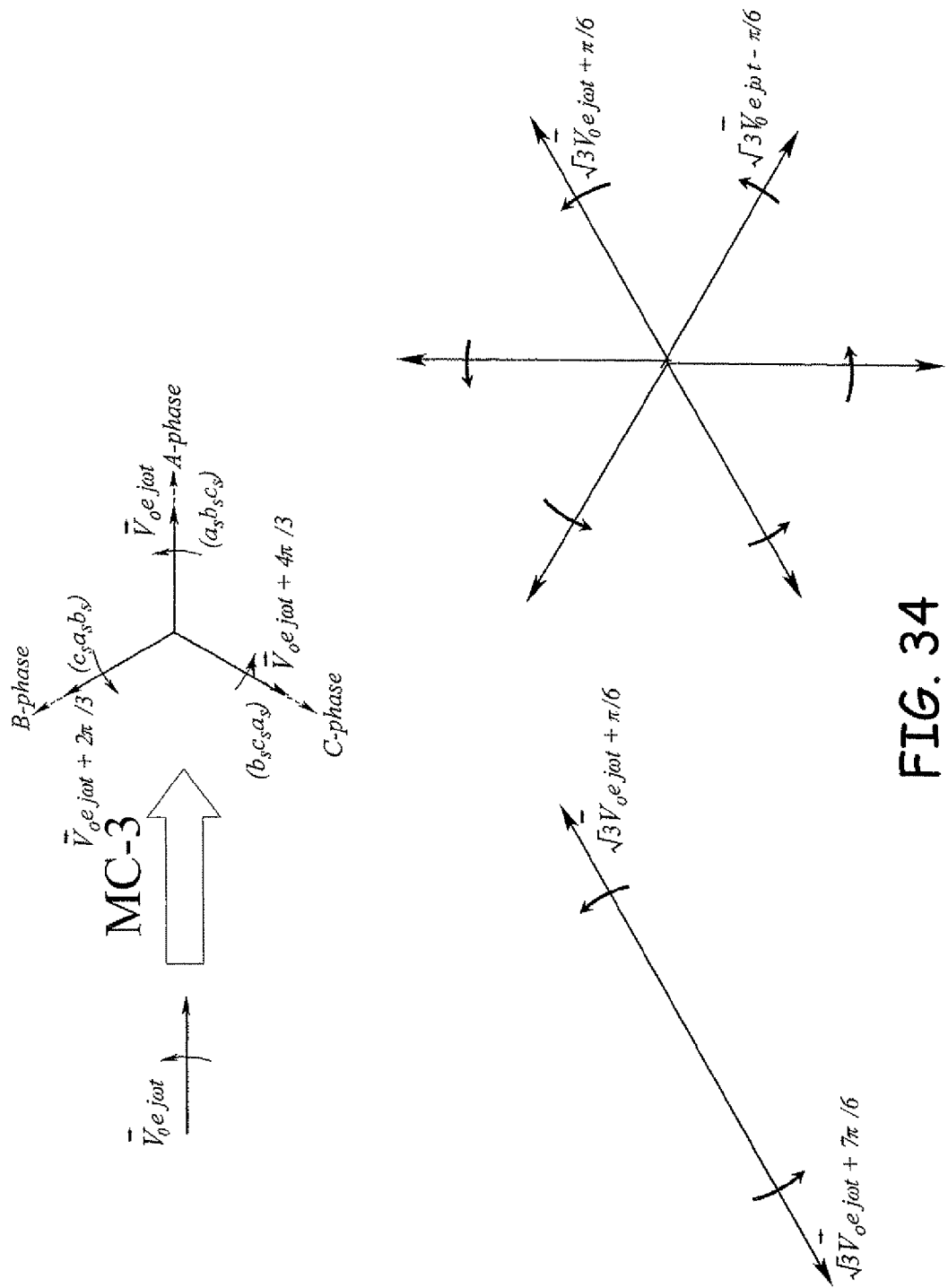
FIG. 34 illustrates using two opposite vectors to generate six anticlockwise (CCW) rotating vectors 60 degrees apart.

However, converter 950 can also generate three space vectors, 120 degrees apart from a single vector. Referring to FIG. 34, using the switching sequence $a_s b_s c_s$, $c_s a_s b_s$, $b_s c_s a_s$, two opposite vectors would generate six anticlockwise (CCW) rotating vectors 60 degrees apart.

By using adjacent vectors in FIG. 34, an output vector can be synthesized at any desired frequency, amplitude and the direction of rotation, where the maximum achievable amplitude is 1.5 pu. In yet a further embodiment, one or more additional converters 960, such as matrix converters, can be connected in parallel with converter 950. Each of the converters 960 can be operated at different frequency, amplitude and directions of rotation relative to each other or converter 950.

In yet another embodiment, in addition or in the alternative to converter 950 and/or converter 960, two converters 970 and 972 can also be configured so as to energize a set of open-ended windings and operated in the manner as described above for energizing another multi-phase AC machine or apparatus (transformer, motor or generator) 980.

Figure 35:
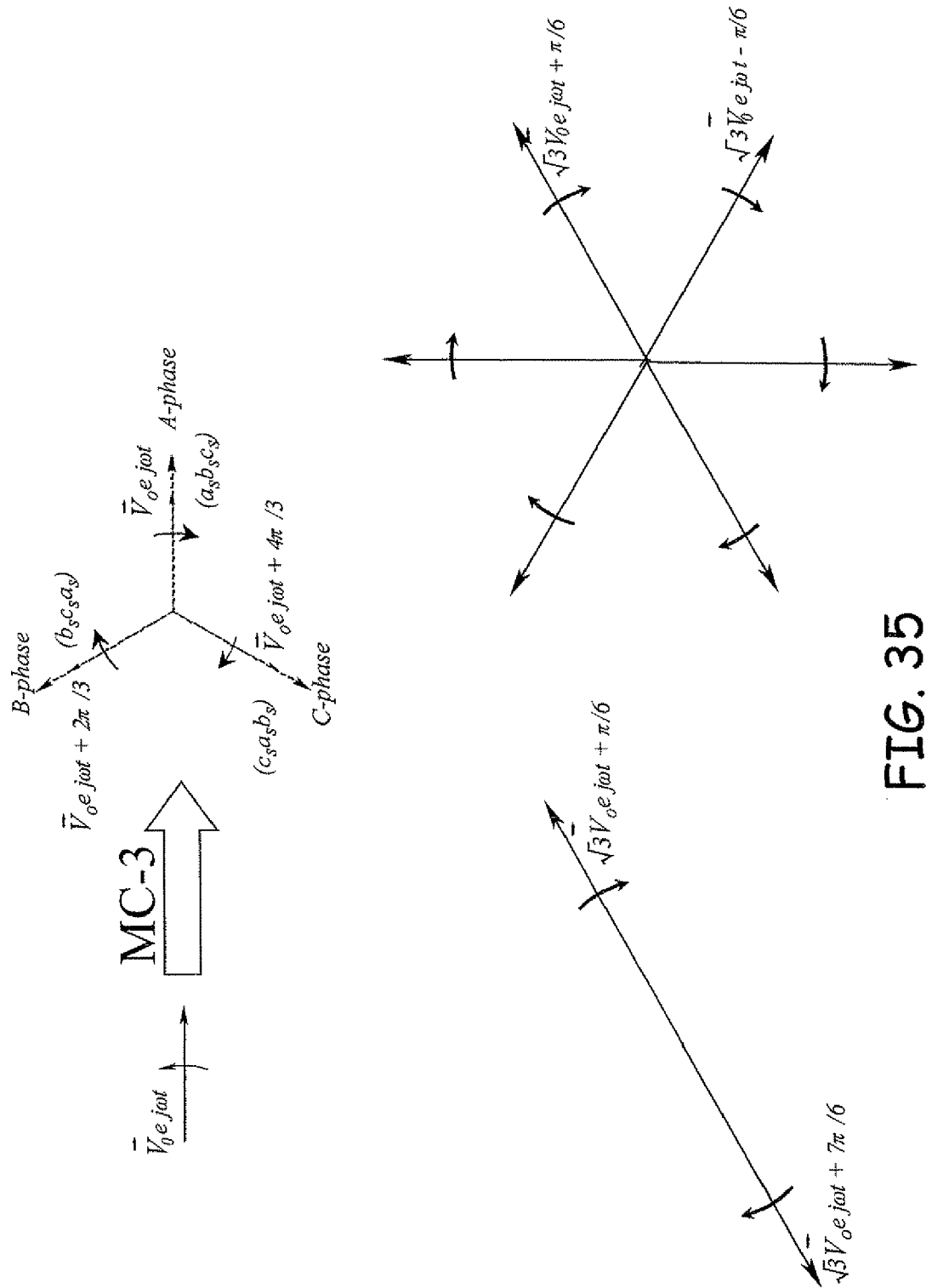
FIG. 35 illustrates using two opposite vectors to generate six clockwise (CW) rotating vectors 60 degrees apart.

Similarly, output voltage synthesis is possible using CW rotating vectors produced by converter 950, as illustrated in FIG. 35.

Figure 36:
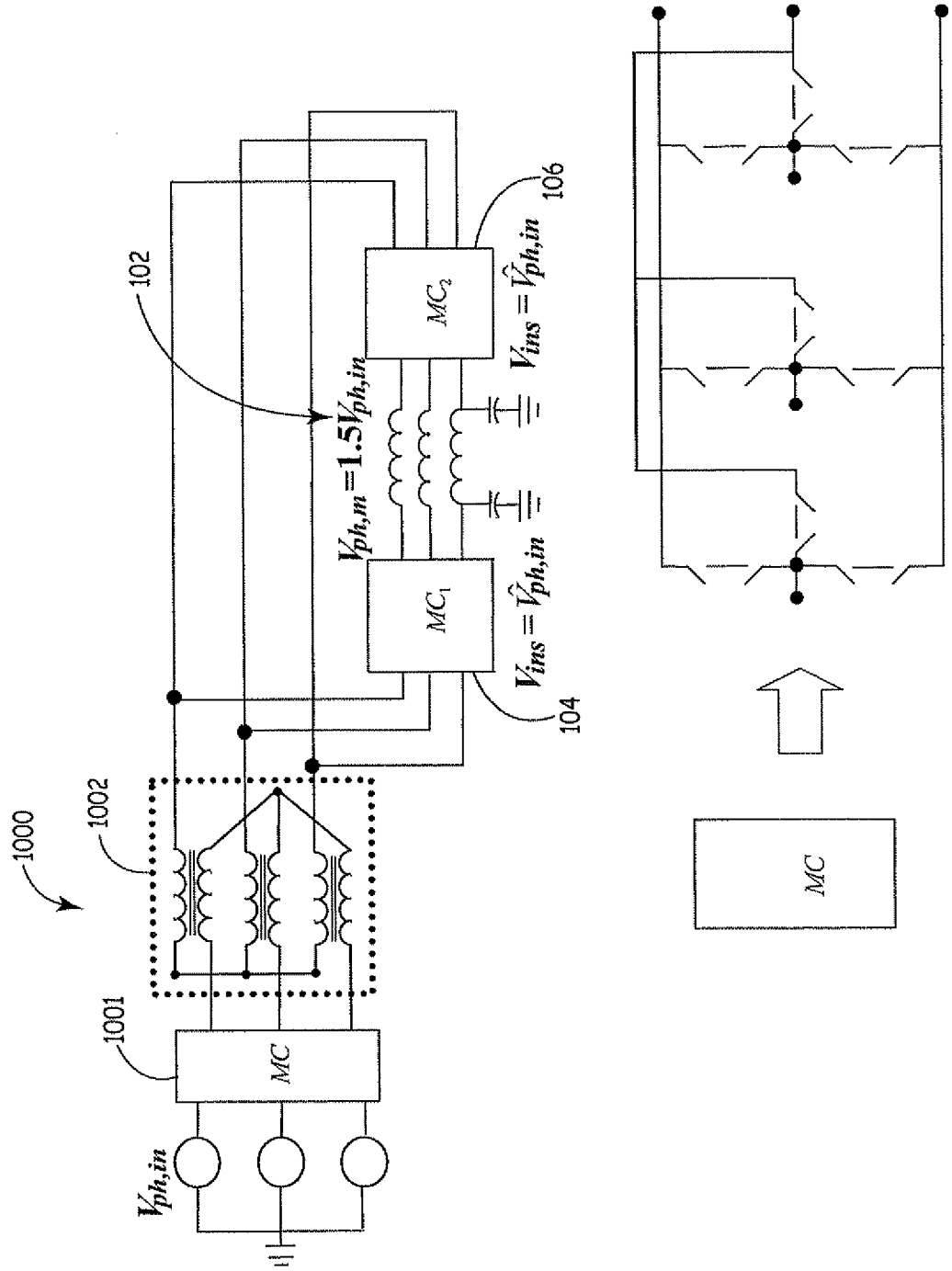
FIG. 36 illustrates a first embodiment using of a high frequency transformer.

In FIG. 36, a high frequency transformer switching assembly 1000 includes a matrix converter 1001 is coupled to a transformer 1002 and operated so as to simulate a low frequency transformer (e.g. 50 or 60 Hz) commonly used between utility system voltages (e.g. 13.8 Kv) and lower voltages for operating machine 102, thereby obviating the need to use such low frequency transformers, which are commonly large and expensive. As illustrated, the primary windings of transformer 1002 are coupled to matrix converter 1001, while the secondary windings are coupled to matrix converters 104 and 106. The matrix converter 1001 is operated so as to enable high frequency voltages (e.g. 1000 Hz to 20 KHz) to be present on the secondary windings of transformer 1002 that in turn are coupled to matrix converters 104 and 106, which in turn enable low frequency voltages present for AC machine 102. Of course, the turns ratio of the transformer 1002 and operating frequency of the matrix converters 1001, 104 and 106 are adjusted based on the application.

Figure 37:
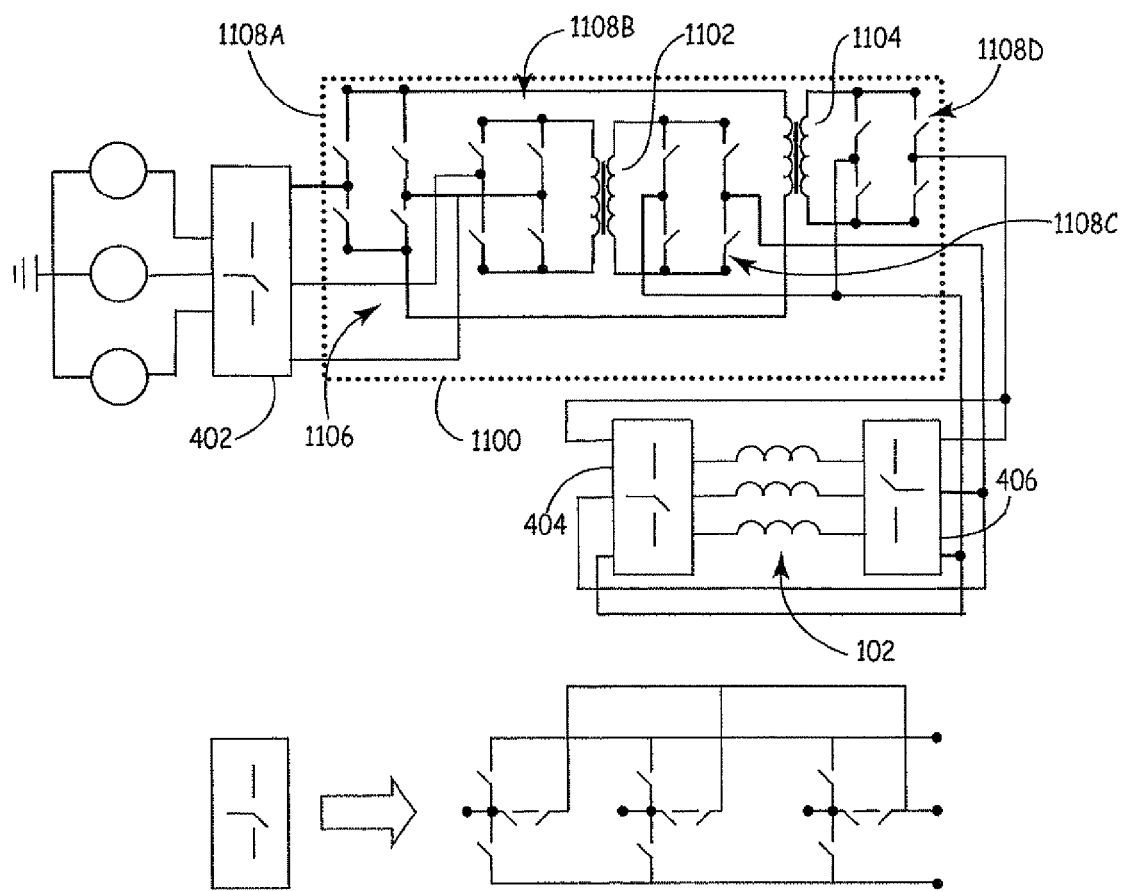
FIG. 37 illustrates a second embodiment using a high frequency transformer.

In FIG. 37, a high frequency transformer switching assembly 1100 is included in the DC link of the two-level inverter topology discussed above (e.g. FIGS. 13 or 14) so as to allow inverter 402 to be coupled directly to high voltages of the utility, again eliminating the need of the low frequency transformer described above. The high frequency transformer switching assembly includes transformers 1102 and 1104 and switches 1106 configured as converters 1108A, 1108B, 1108C and 1108D operably coupled in the DC link. Converters 1108A and 1108B are coupled to the primary windings of transformers 1102 and 1104 and inverter 402, while converters 1108C and 1108D are coupled to the secondary windings of transformers 1102 and 1104 and inverters 404 and 406.

Figure 38:
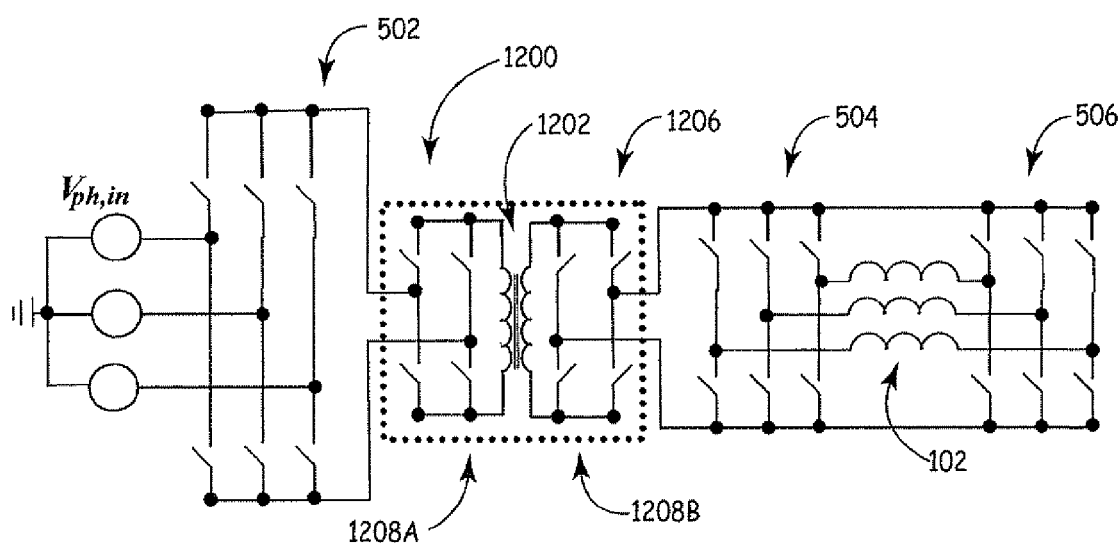
FIG. 38 illustrates a second embodiment using a high frequency transformer.

In FIG. 38, a high frequency transformer switching assembly 1200 is included in the DC link of the two-level inverter topology discussed above (e.g. FIGS. 15 or 17) so as to allow inverter 502/DC matrix converter 602 to be coupled directly to high voltages of the utility, again eliminating the need of the low frequency transformer described above. The high frequency transformer switching assembly 1200 includes a transformer 1202 and switches 1206 configured as converters 1208A and 1208B operably coupled in the DC link. Converter 1208A is coupled to the primary windings of transformer 1202 and inverter 502 while converter 1208B is coupled to the secondary windings of transformer 1202 and inverters 504 and 506. Using one transformer 1202 results in rectangular current pulses of 120 degrees for each half cycle at the utility.

Figure 39:
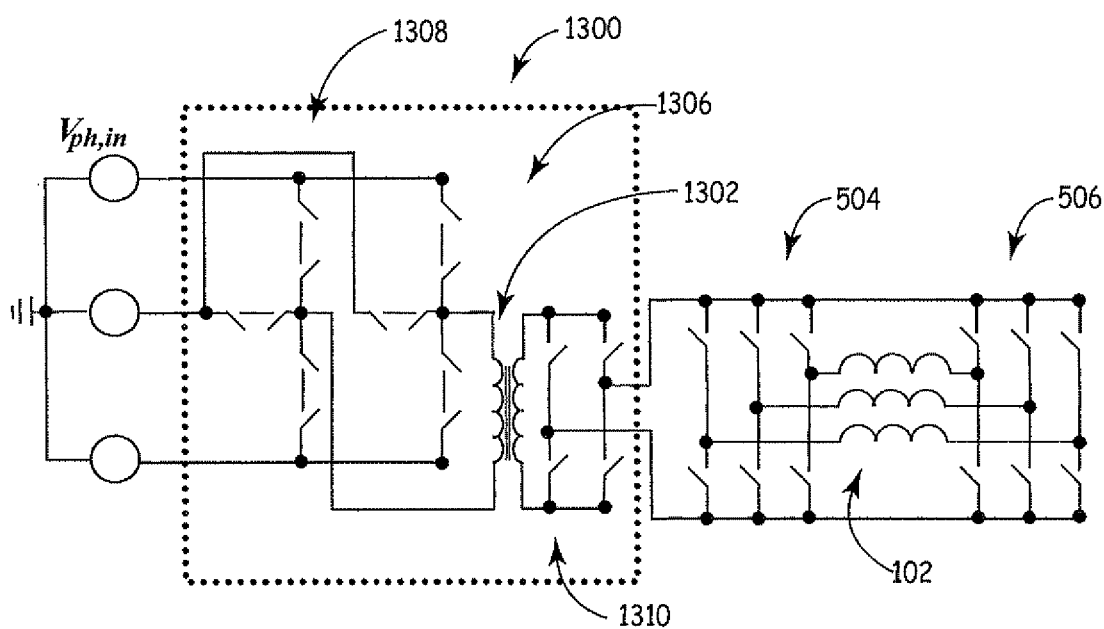
FIG. 39 illustrates a second embodiment using a high frequency transformer.

In FIG. 39, a high frequency transformer switching assembly 1300 also provides a two-level DC link or is operably connected in the DC link. The high frequency transformer switching assembly 1300 includes a transformer 1302 and switches 1306 configured as a matrix converter 1308 (the topology of switches is merely exemplary) and a converter 1310 coupled in the DC link. Matrix converter 1308 is coupled to the primary windings of transformer 1302 and the utility, while inverter 1310 is coupled to the secondary windings of transformer 1302 and inverters 504, 604 and 506, 606. In this embodiment, matrix converter 1308 could be considered not as being part of the a high frequency transformer switching assembly 1300, but rather a matrix converter that is coupled to the utility or AC source.

Power Factor Control

Figure 40:
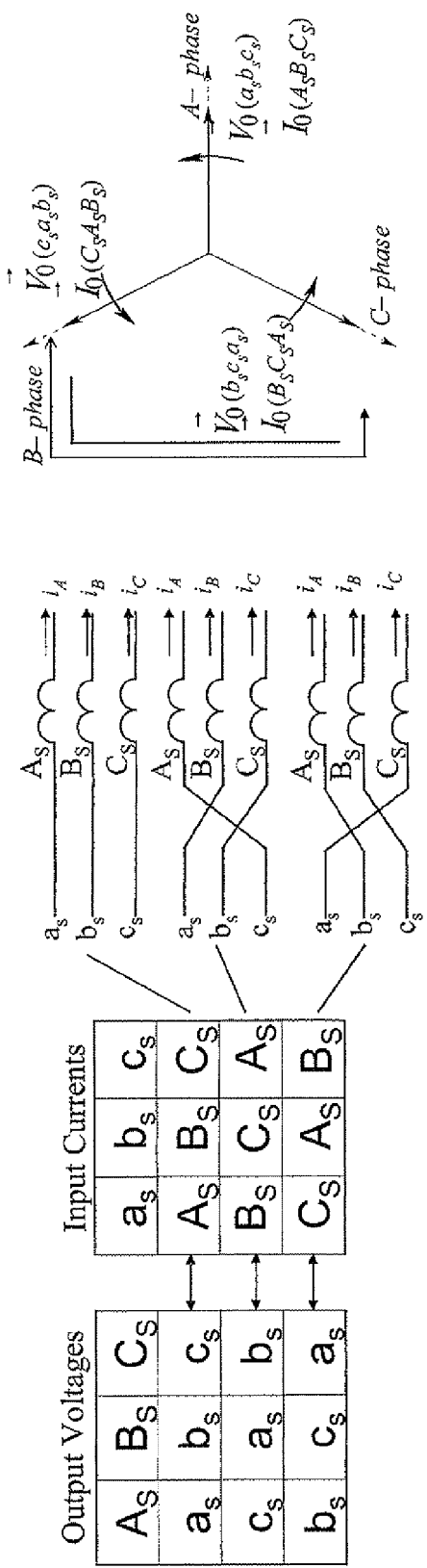
FIG. 40 illustrates the voltage and current vectors corresponding to a CCW rotating sequence.

The logic for input power factor control in case of transformer is similar to schemes described for motor and generator. For the transformer in FIG. 30 by using the generated vectors from FIG. 34 and FIG. 35 in the logical sequence described for the open ended motor power factor is controllable in any range. For the case in FIG. 36 matrix converter 1001 may be controlled according to FIG. 28 and the power factor control is achieved in the converters 104 and 106 by combining the logic of FIG. 29 and logic of the open ended motor power factor control. In FIG. 37 the power factor control is accomplished in machine converters 404 and 406 from the reconstructed DC-link voltages after the transformer. In FIG. 38 the displacement factor is always unity and in FIG. 39 the power factor control is achieved at the input rectifier only. Assuming that the output vector is rotating CCW, FIG. 40 illustrates the voltage and current vectors corresponding to CCW rotating sequence. Hence the input power factor is the same as the output power factor.

Figure 41:
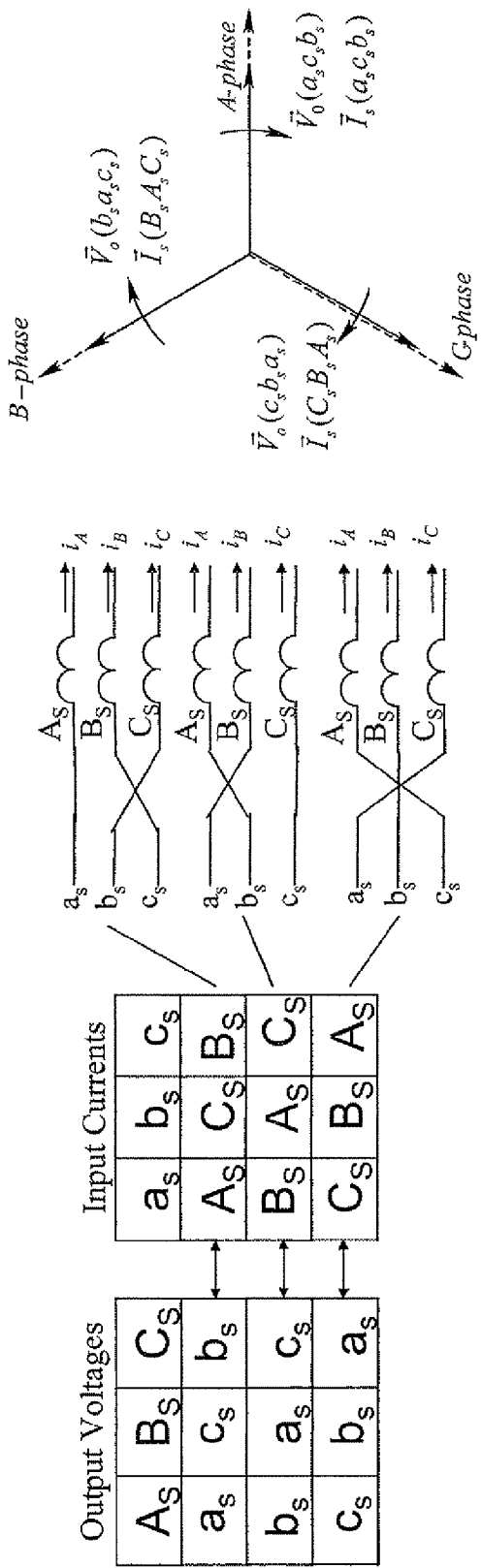
FIG. 41 illustrates the voltage and current vectors corresponding to CW rotating sequence.

Similarly, FIG. 41 illustrates the voltage and current vectors corresponding to CW rotating sequence. Here, the input power factor is opposite of the output power factor.

Figure 42:
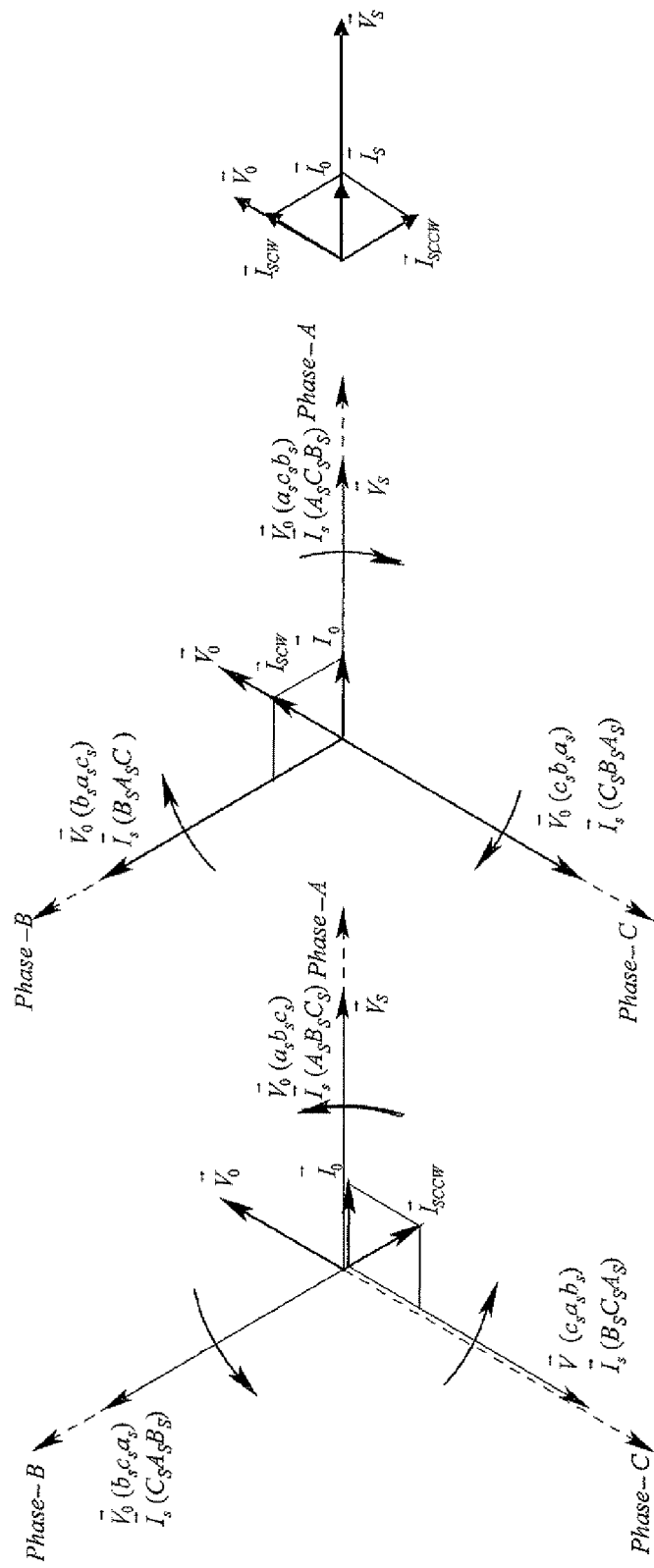
FIG. 42 illustrates obtaining unity power factor by alternately using equal durations of CCW and CW vectors.

By alternately using equal durations of CCW and CW vectors, it is possible to get a unity power factor, for example, as shown in FIG. 42. Likewise, any input power factor can be achieved without any loss of the output voltage capability, provided the input power factor is within the range between the output power factor and the negative of the output power factor.

Based on the switching sequences described, converters 940 and 942 need only 6 bidirectional switches each. However, converter 950 needs 9 bidirectional switches.

With respect to the AC machine or apparatus being a transformer, advantages of the proposed topologies include significantly reduced size, while eliminating large storage capacitors that are needed in traditional voltage-link systems. The output voltage of the system can be greater than 1.0 per unit and up to 1.5 per unit, while also providing a controllable input power factor, and bi-directional power flow. The output frequency can be selected as needed, for example, when powering variable speed motor drives. Further, no common-mode voltage switching is present. Higher efficiencies are achieved due to reduced conversion stages compared to that of in voltage-link system and due to the possibility of soft switching. In addition, it is possible to supply variable speed drives from the high-frequency link, thus bypassing one conversion stage for higher efficiency. Furthermore, the system is well suited for using electronic switching devices such as SiC devices.

The topologies can also operate in less than ideal conditions. For instance, the input multi-phase voltages can be unbalanced, but the output three-phase voltages can be synthesized to be balanced. Even when the input voltages are balanced, resulting in balanced output voltages, the output load may be unbalanced. In this case, it is possible to make the input currents somewhat balanced by introducing harmonics in the input currents. Furthermore, a single-phase output voltage can be synthesized.

Another advantage of the embodiments described above is that in a method of control or operation since each embodiment provides/generates increased voltages, the operating point (voltage) of the AC machine (motor, generator or transformer) can be chosen such that it is less than full capability. In this manner, if line voltage drops from the first set of voltages, the controller used in each of the embodiments can operate the corresponding converters to increase gain and thus restore the desired operating point.

Furthermore, in the case of an unbalance between the three windings, it is possible to inject zero-sequence voltages at both ends of these windings in order to reduce the zero-sequence currents. These zero-sequence voltages at each should be comprised of first set of voltages in such a way that the sum of the two zero-sequence voltages is zero. (For example, va,vb,vb on one side and va,vc,vc on the other side, and hence 2va+2vb+2vc=0.) And hence, in spite of zero-sequence voltages on each side, the bearing current would be zero.

Similarly, zero-sequence voltages (along with other harmonics, if desired) can be injected as necessary at one or both ends of the windings of the machine 102 to get higher efficiency in machines with other than sinusoidal EMFs (electromotive forces) and sinusoidal currents (for example, rectangular 180 degree EMFs and/or quasi-rectangular currents). In this case, injecting zero-sequence voltages intentionally cause zero-sequence currents. In yet another embodiment, a positive zero-sequence voltage can be injected at one end of the windings of the AC machine 102, while an equal but negative zero-sequence voltage can be injected at the other end of the windings. This embodiment will not cause any bearing currents to flow, but will cause circulating zero-sequence currents of desired magnitude to flow in the windings of the AC machine 102. This will nullify the zero-sequence currents due to winding unbalances.

As appreciated by those skilled in the art, injection of zero-sequence voltages comprises controlling the switches of the foregoing embodiments to generate such zero-sequence voltages. If necessary, suitable sensors can be used as feedback depending on the parameter being controlled with zero-sequence voltages. For instance, voltage sensors can be used to monitor the phase voltages. It may be noted that any zero sequence voltage cancellation at motor windings is achieved at expense of input power quality and/or output voltage amplitude.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A control system for energizing open-ended windings, the control system comprising a drive circuit having switching devices and at least six terminals operably connected to the switching devices, each of the terminals configured to be connected to an end of one of the open-ended windings, the drive circuit configured to operate the switching devices to transfer real AC power between a first set of voltages and through the terminals to the open-ended windings without the use of a substantial energy storage device while eliminating common mode voltage, and wherein the drive circuit comprises two converters, a first converter operably coupled to the first set of voltages and a first side of the open-ended windings, the first side having a first end of each of the open-ended windings, and a second converter operably coupled to the first set of voltages and a second side of the open-ended windings, the second side having a second end of each of the open-ended windings, wherein each converter is selectively operated to provide a set of voltages rotating either clockwise or counter-clockwise with respect to a reference frame of the machine having the open-ended windings.

2. The control system of claim 1 wherein each of the converters comprise matrix converters.

3. The control system of claim 1 wherein the drive circuit further comprises a third converter coupled to the first set of voltages and configured to transfer power to each of the first and second converters through a pulsating DC link of voltages.

4. The control system of claim 1 and wherein each of the converters is operated to either repeatedly apply voltages rotating clockwise for a first selected time period and voltages rotating counter-clockwise for a second selected time period, where a ratio of the first selected time period to the second selected time period adjusts a power factor seen by an energy source providing the first set of voltages.

5. A control system for energizing open-ended windings, the control system comprising a drive circuit having switching devices and at least six terminals operably connected to the switching devices, each of the terminals configured to be connected to an end of one of the open-ended windings, the drive circuit configured to operate the switching devices to transfer real AC power between a first set of voltages and through the terminals to the open-ended windings without the use of a substantial energy storage device, wherein the drive circuit comprises two converters, a first converter operably coupled to the first set of voltages and a first side of the open-ended windings, the first side having a first end of each of the open-ended windings, and a second converter operably coupled to the first set of voltages and a second side of the open-ended windings, the second side having a second end of each of the open-ended windings, wherein each converter injects zero-sequence voltage at each respective side of the open-ended windings such that the sum of the zero-sequence voltage injected to the first side and the zero-sequence voltage inected to the second side is substantially zero.

6. The control system of claim 5 wherein the drive circuit further comprises a third converter coupled to the first set of voltages and configured to transfer power to each of the first and second converters through a pulsating DC link of voltages.

7. The control system of claim 5 wherein each of the converters comprise matrix converters.

8. The control system of claim 5 and wherein the drive circuit adjusts an input power factor to the open-ended windings.

9. A control system for energizing open-ended windings, the control system comprising a drive circuit configured to transfer AC power between a first set of voltages and each end of the open-ended windings without the use of a substantial energy storage device wherein the drive circuit comprises three converters each converter having switching devices, wherein a first converter is coupled to the first set of voltages and configured to operate the switching devices thereof to provide a pulsating DC link of voltages, a second converter is coupled to the DC link of voltages and a first end of the open-ended windings, and a third converter is coupled to the DC link of voltages and a second end of the open-ended windings.

10. The control system of claim 9 wherein the second and third converters each comprise inverters.

11. The control system of claim 9 wherein the first converter comprises an inverter.

12. The control system of claim 11 wherein the inverter comprises a three-level inverter.

13. The control system of claim 11 wherein the inverter comprises a two-level inverter.

14. The control system of claim 9 wherein the first converter comprises a DC matrix converter.

15. The control system of claim 9 and further comprising means for adjusting an input power factor to the open-ended windings.

16. The control system of claim 9 and further comprising a high frequency transformer switching assembly including at least one high frequency transformer operably coupled in the DC link.

17. The control system of claim 9 wherein the second and third converters are configured to provide multi-phase AC voltages rotating clockwise and counter-clockwise.

18. The control system of claim 17 wherein the second and third converters are configured to provide multi-phase AC voltages rotating clockwise for a selected duration and counter-clockwise for another selected duration.

19. The control system of claim 9 and further comprising an active filter coupled to the DC link of voltages.

20. A method for energizing open-ended windings of an AC machine, the method comprising:
providing a drive circuit having a plurality of switching devices and at least six terminals operably connected to the switching devices, wherein the drive circuit comprises a first converter and a second converter;
connecting each of the terminals to an end of one of the open-ended windings, wherein the first converter is coupled to a first end of the open-ended windings and the second converter is coupled to a second end of the open-ended windings;
while eliminating common mode voltage and/or injecting zero sequence voltages,
connecting the AC machine to a source of multi-phase AC power with the drive circuit;
directly converting real power to or from the AC machine with two sets of multi-phase AC voltages with the and second converters and without the use of a substantial energy storage device;
using the first converter to provide a first set of the multi-phase AC voltages to first ends of the open-ended windings, using the second converter to provide a second set of the multi-phase AC voltages to second ends of the open-ended windings, wherein each converter is selectively operated to provide a set of voltages rotating either clockwise or counter-clockwise with respect to a reference frame of the machine having the open-ended windings.

21. The method of claim 20 and further comprising adjusting the input power factor of the source of multi-phase AC power.

22. A method for energizing open-ended windings of an AC machine, the method comprising:
providing a drive circuit having a plurality of switching devices and at least six terminals operably connected to the switching devices, wherein the drive circuit comprises a first converter and a second converter;
connecting each of the terminals to an end of one of the open-ended windings wherein the first converter is coupled to a first end of the open-ended windings and the second converter is coupled to a second end of the open-ended windings;

connecting the AC machine to a source of multi-phase AC power with the drive circuit;

directly converting real power to or from the AC machine with two sets of multi-phase AC voltages with the first and second converters and using a pulsating DC link of voltages and without the use of a substantial energy storage device;

using the first converter to provide a first set of the multi-phase AC voltages to first ends of the open-ended windings; and using the second converter to provide a second set of the multi-phase AC voltages to second ends of the open-ended windings.

23. The method of claim 22 and further comprising adjusting the input power factor of the source of multi-phase AC power.

* * * * *